US011993187B2

(12) United States Patent
Yamaguchi et al.

(10) Patent No.: US 11,993,187 B2
(45) Date of Patent: May 28, 2024

(54) VEHICLE SEAT

(71) Applicant: TS TECH CO., LTD., Asaka (JP)

(72) Inventors: Takanori Yamaguchi, Tochigi (JP); Heehyeok Park, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 35 days.

(21) Appl. No.: 17/920,151

(22) PCT Filed: Apr. 20, 2021

(86) PCT No.: PCT/JP2021/016016
§ 371 (c)(1),
(2) Date: Oct. 20, 2022

(87) PCT Pub. No.: WO2021/215434
PCT Pub. Date: Oct. 28, 2021

(65) Prior Publication Data
US 2023/0147969 A1 May 11, 2023

Related U.S. Application Data

(60) Provisional application No. 63/013,770, filed on Apr. 22, 2020.

(30) Foreign Application Priority Data

Jul. 2, 2020 (JP) .................................. 2020-114675

(51) Int. Cl.
*B60N 2/66* (2006.01)
*B60N 2/90* (2018.01)
(Continued)

(52) U.S. Cl.
CPC ............... *B60N 2/99* (2018.02); *B60N 2/914* (2018.02); *A47C 7/467* (2013.01); *A47C 7/54* (2013.01); *B60N 2/665* (2015.04); *B60N 2/667* (2015.04)

(58) Field of Classification Search
CPC ........ B60N 2/665; B60N 2/667; B60N 2/914; B60N 2/99; A47C 7/54; A47C 7/467
See application file for complete search history.

(56) References Cited

U.S. PATENT DOCUMENTS 9,517,777 B2 * 12/2016 Hall ....................... B60N 2/914
10,286,825 B2 * 5/2019 Boland .................... B60N 2/99
(Continued)

FOREIGN PATENT DOCUMENTS

JP 2015-209062 11/2015
JP 2015-209082 11/2015
(Continued)

OTHER PUBLICATIONS

PCT International Search Report and Written Opinion (w/ English translation) for corresponding PCT Application No. PCT/JP2021/016016, dated Jul. 6, 2021, 9 pages.

*Primary Examiner* — Syed A Islam
(74) *Attorney, Agent, or Firm* — Dority & Manning, PA

(57) ABSTRACT

A vehicle seat is provided with a seat cushion and a seat back, the seat back includes: left and right side members extending up and down; a lower cross member extending laterally and joined to the left and right side members, a cross member extending laterally above the lower cross member and joined to the left and right side members; at least one wire member extending up and down and joined to the lower cross member and the cross member; and at least one shoulder support member supported on an upper portion of the wire member. The shoulder support member includes: a first plate part facing in a front-rear direction and joined to the upper portion of the wire member; and a second plate part facing in the front-rear direction and connected to the first plate part via a flexible part.

15 Claims, 14 Drawing Sheets

(51) Int. Cl.
 A47C 7/46 (2006.01)
 A47C 7/54 (2006.01)

(56) References Cited

U.S. PATENT DOCUMENTS

| | | | |
|---|---|---|---|
| 10,358,065 B2 * | 7/2019 | McMillen | B60N 2/665 |
| 10,479,248 B2 * | 11/2019 | Izukawa | B60N 2/0268 |
| 10,765,219 B1 * | 9/2020 | Cabble | A61H 9/0078 |
| 10,974,634 B2 * | 4/2021 | Ceglarek | B60N 2/70 |
| 2009/0309402 A1 | 12/2009 | Rehfuss | |
| 2015/0306999 A1 | 10/2015 | Awatani | |
| 2016/0221481 A1 | 8/2016 | Sugiyama | |
| 2017/0088029 A1 | 3/2017 | Mizoi et al. | |
| 2018/0326881 A1 * | 11/2018 | Patrick | B60N 2/914 |
| 2023/0027678 A1 * | 1/2023 | Ryszawa | B60N 2/643 |

FOREIGN PATENT DOCUMENTS

| | | |
|---|---|---|
| JP | 2017-124776 | 7/2017 |
| JP | 2018-034730 | 3/2018 |

\* cited by examiner

VEHICLE SEAT

CROSS REFERENCE TO RELATED APPLICATIONS

This application is the U.S. National Stage entry of International Application No. PCT/JP2021/016016 filed under the Patent Cooperation Treaty on Apr. 20, 2021, which claims priority to U.S. Provisional Patent Application No. 63/013,770 filed on Apr. 22, 2020 and Japanese Patent Application No. 2020-114675 filed on Jul. 2, 2020, both of which are incorporated herein by reference.

TECHNICAL FIELD

The present invention relates to a vehicle seat.

BACKGROUND ART

Patent Document 1 discloses a seat back including a lumber support member and left and right shoulder support members. The left and right shoulder support members are integrally formed at an upper end of the lumber support member. Patent Document 2 discloses a seat back including a single shoulder support member that extends laterally. In Patent Document 2, the shoulder support member is independent from the lumber support member and is joined to the blower.

PRIOR ART DOCUMENT(S)

Patent Document(s)

[Patent Document 1] JP2015-209082A
[Patent Document 2] JP2015-209062A

SUMMARY OF THE INVENTION

Task to be Accomplished by the Invention

The shoulder support member can support the seated person comfortably by moving and deforming along the shoulder portion of the seated person. However, since the shoulder support member of Patent Document 1 is joined to the lumber support member, there is a problem that it is difficult to move and deform. Similarly, the shoulder support member of Patent Document 2 is joined to the blower, and therefore, there is a problem that it is difficult to move and deform. Accordingly, there is a problem that the shoulder support members of Patent Documents 1 and 2 cannot support the shoulder portion of the seated person comfortably.

In view of the foregoing background, an object of the present invention is to provide a vehicle seat capable of supporting the shoulder portion of the seated person comfortably.

Means to Accomplish the Task

To achieve the above object, there is provided a vehicle seat (1) provided with a seat cushion (3) and a seat back (4), wherein the seat back comprises: left and right side members (22) extending up and down; a lower cross member (24) extending laterally and joined to the left and right side members; a cross member (25) extending laterally above the lower cross member and joined to the left and right side members; at least one wire member (31) extending up and down and joined to the lower cross member and the cross member; and at least one shoulder support member (32) supported on an upper portion of the wire member, and the shoulder support member comprises: a first plate part (32A) facing in a front-rear direction and joined to the upper portion of the wire member; and a second plate part (32C) facing in the front-rear direction and connected to the first plate part via a flexible part (32B).

According to this aspect, the second plate part can be displaced relative to the first plate part with deformation of the flexible part. Therefore, when the shoulder support member is pushed by the shoulder portion of the seated person, the first plate part and the second plate part can move to be along the shoulder portion. Thereby, a vehicle seat capable of supporting the shoulder portion of the seated person comfortably can be provided.

In the above aspect, preferably, a plate-shaped lumber support member (44) facing in the front-rear direction is supported on a lower portion of the wire member.

According to this aspect, it is possible to support the shoulder support member by using the wire member supporting the lumber support member.

In the above aspect, preferably, the wire member includes a first portion (31A) and a second portion (31B) that are inclined relative to each other via a bending portion, and the first plate part of the shoulder support member includes a first locking portion (34) that locks the first portion and a second locking portion (35) that locks the second portion.

According to this aspect, since the first locking portion and the second locking portion lock the first portion and the second portion that are inclined relative to each other, the position of the shoulder member relative to the wire member can be fixed.

In the above aspect, preferably, the first plate part of the shoulder support member includes a positioning part (36) between the first locking portion and the second locking portion, the positioning part contacting the first portion and the second portion.

According to this aspect, due to the positioning part contacting the first portion and the second portion, the position of the shoulder member relative to the wire member can be fixed even more reliably.

In the above aspect, preferably, the first plate part and the flexible part are disposed between the left and right side members as seen from front, and at least a part of the second plate part is disposed in front of the side member.

According to this aspect, the first plate can be displaced rearward relative to the second plate part along the back of the seated person.

In the above aspect, preferably, the flexible part extends up and down along a laterally inner side edge of the side member as seen from front.

According to this aspect, the first plate part can be displaced rearward without interfering with the side member.

In the above aspect, preferably, the flexible part has a slit (39) penetrating therethrough in the front-rear direction and extending up and down with a lower end opened.

According to this aspect, the first plate part can be easily displaced relative to the second plate part.

In the above aspect, preferably, a fluid bag assembly (52) that inflates upon supply of fluid is provided on a front surface of the shoulder support member.

According to this aspect, the fluid bag can change the shape of the pad disposed in front of the shoulder support member. Thereby, the vehicle seat can support the shoulder portion of the seated person comfortably.

In the above aspect, preferably, the shoulder support member includes a support surface (32F) extending along a first direction and facing forward, a fluid supply device (53) is connected to the fluid bag assembly, one side in the first direction is referred to as a first side and another side in the first direction is referred to as a second side, the fluid bag assembly comprises: a first fluid bag (56) disposed on the support surface; a second fluid bag (57) which includes, in an end portion on the first side, a first joining part (61) joined to the first fluid bag, and communicates with the first fluid bag; and a third fluid bag (58) which includes, in an end portion on the first side, a second joining part (62) joined to the second fluid bag, and communicates with the second fluid bag, and in a state in which the fluid bag assembly is deflated, a first side edge (61A), which is a side edge of the first joining part on the second side, and a second side edge (62A), which is a side edge of the second joining part on the second side, each extend linearly and extend in mutually different directions, as seen in a direction perpendicular to the support surface.

According to this aspect, since the first side edge and the second side edge extend in mutually different directions, it is possible to vary the inflation direction of the second fluid bag and the inflation direction of the third fluid bag. Thereby, the shape of the fluid bag assembly when inflated can be diversified.

In the above aspect, preferably, the second side edge is disposed further on the second side than the first side edge.

According to this aspect, the shape of the fluid bag assembly when inflated can be diversified.

In the above aspect, preferably, a length of the second fluid bag in the first direction is longer than a length of the third fluid bag in the first direction.

According to this aspect, the shape of the fluid bag assembly when inflated can be diversified.

In the above aspect, preferably, the fluid supply device is connected to the first fluid bag, the first fluid bag and the second fluid bag are connected by a first communication hole (61B) passing through the first joining part, and the second fluid bag and the third fluid bag are connected by a second communication hole (62B) passing through the second joining part.

According to this aspect, the structure for connecting the air supply device and the fluid bag assembly can be made simple.

In the above aspect, preferably, the first fluid bag, the second fluid bag, and the third fluid bag extend in the first direction.

According to this aspect, the shape of the fluid bag assembly when deflated can be made simple.

In the above aspect, preferably, the first fluid bag includes a tab (56D) protruding to a side, and the tab is fastened to a side surface perpendicular to the support surface of the shoulder support member.

According to this aspect, the shoulder support can be made compact in size and the fluid bag assembly can be made compact in size.

In the above aspect, preferably, the shoulder support member includes a pair of left and right shoulder support members and the fluid bag assembly includes a pair of left and right fluid bag assemblies, the left and right shoulder support members are disposed on a left part and a right part of an upper portion of the seat back such that the first side is directed laterally inward and downward, and in the state in which the fluid bag assembly is deflated, each of the first side edge and the second side edge extends obliquely downward in a laterally outward direction, as seen from front.

According to this aspect, the fluid bag assemblies can make parts of the seat back corresponding to the shoulders of the seated person swell laterally inward and downward. Thereby, a seat back in conformity with the position and shape of the shoulders of the seated person can be provided.

In the above aspect, preferably, the second plate part and the side member contact each other in the front-rear direction.

According to this aspect, the position of the second plate part in the seat back can be fixed.

In the above aspect, preferably, the second plate part extends along the side member as seen from front.

According to this aspect, since the second plate member exists between the shoulder portion of the seated person and the side member, the shoulder portion of the seated person can be supported comfortably.

In the above aspect, preferably, the second plate part includes a butting portion (37) that protrudes rearward in a rear portion thereof, and the second plate part contacts the side member at the butting portion.

According to this aspect, the second plate part and the side member can reliably contact each other.

In the above aspect, preferably, the second plate part and the side member contact each other in the front-rear direction via a cushioning material (38).

According to this aspect, the cushioning material prevents friction and rattling between the second plate part and the side member, whereby generation of noise is prevented.

In the above aspect, preferably, a rear surface of the second plate part is provided with a reinforcement structure (41).

According to this aspect, it is possible to improve the stiffness of the second plate part that contacts the side member.

In the above aspect, preferably, the wire member includes a pair of left and right wire members, and the shoulder support member includes a pair of left and right shoulder support members corresponding to the left and right wire members.

According to this aspect, the left and right shoulder support members can be displaced independently from each other so as to be along the shoulder portion of the seated person. Thereby, a vehicle seat capable of supporting the shoulder portion of the seated person comfortably can be provided.

In the above aspect, preferably, a laterally inner side edge of the first plate part is inclined laterally outward toward an upward direction.

According to this aspect, a space can be formed between upper portions of the left and right shoulder supports. Devices such as a blower may be disposed in the space.

In the above aspect, preferably, a blower (46) is provided in a central portion of an upper portion of the seat back, and the left and right shoulder supports are disposed to left and right of the blower.

According to this aspect, the fluid bag assembly and the blower can be disposed within the seat back so as not to interfere with each other.

In the above aspect, preferably, the blower includes: a blower main body (36) provided with an impeller; and a duct (46B) extending from the blower main body, wherein the blower main body is disposed in the central portion of the upper portion of the seat back, the duct extends up and down on a side of the blower main body, and one of the left and right shoulder supports is disposed to left or right of the duct.

According to this aspect, the fluid bag assembly and the blower can be disposed within the seat back so as not to interfere with each other.

In the above aspect, preferably, one of left and right side portions of the seat back is provided with a first side airbag (48), another of the left and right side portions of the seat back is provided with a second side airbag (49), each of the first side airbag and the second side airbag extends up and down, an upper end of the first side airbag is positioned higher than an upper end of the second side airbag, and a lower end of each of the left and right shoulder supports is positioned higher than the upper end of the second side airbag.

According to this aspect, the fluid bag assembly and the side airbag can be disposed within the seat back so as not to interfere with each other.

In the above aspect, preferably, each of the left and right fluid bag assemblies has a recess that is recessed laterally outward on a laterally inner side edge thereof, and left and right side portions of the blower are disposed in the respective recesses.

According to this aspect, the fluid bag assemblies and the blower can be disposed at a high density.

Effect of the Invention

To achieve the above object, there is provided a vehicle seat (1) provided with a seat cushion (3) and a seat back (4), wherein the seat back comprises: left and right side members (22) extending up and down; a lower cross member (24) extending laterally and joined to the left and right side members; a cross member (25) extending laterally above the lower cross member and joined to the left and right side members; at least one wire member (31) extending up and down and joined to the lower cross member and the cross member; and at least one shoulder support member (32) supported on an upper portion of the wire member, and the shoulder support member comprises: a first plate part (32A) facing in a front-rear direction and joined to the upper portion of the wire member; and a second plate part (32C) facing in the front-rear direction and connected to the first plate part via a flexible part (32B1).

According to this aspect, the second plate part can be displaced relative to the first plate part with deformation of the flexible part. Therefore, when the shoulder support member is pushed by the shoulder portion of the seated person, the first plate part and the second plate part can move to be along the shoulder portion. Thereby, a vehicle seat capable of supporting the shoulder portion of the seated person comfortably can be provided.

In the above aspect, preferably, a plate-shaped lumber support member (44) facing in the front-rear direction is supported on a lower portion of the wire member.

According to this aspect, it is possible to support the shoulder support member by using the wire member supporting the lumber support member.

In the above aspect, preferably, the wire member includes a first portion (31A) and a second portion (31B) that are inclined relative to each other via a bending portion, and the first plate part of the shoulder support member includes a first locking portion (34) that locks the first portion and a second locking portion (35) that locks the second portion.

According to this aspect, since the first locking portion and the second locking portion lock the first portion and the second portion that are inclined relative to each other, the position of the shoulder member relative to the wire member can be fixed.

In the above aspect, preferably, the first plate part of the shoulder support member includes a positioning part (36) between the first locking portion and the second locking portion, the positioning part contacting the first portion and the second portion.

According to this aspect, due to the positioning part contacting the first portion and the second portion, the position of the shoulder member relative to the wire member can be fixed even more reliably.

In the above aspect, preferably, the first plate part and the flexible part are disposed between the left and right side members as seen from front, and at least a part of the second plate part is disposed in front of the side member.

According to this aspect, the first plate can be displaced rearward relative to the second plate part along the back of the seated person.

In the above aspect, preferably, the flexible part extends up and down along a laterally inner side edge of the side member as seen from front.

According to this aspect, the first plate part can be displaced rearward without interfering with the side member.

In the above aspect, preferably, the flexible part has a slit (39) penetrating therethrough in the front-rear direction and extending up and down with a lower end opened.

According to this aspect, the first plate part can be easily displaced relative to the second plate part.

In the above aspect, preferably, a fluid bag assembly (52) that inflates upon supply of fluid is provided on a front surface of the shoulder support member.

According to this aspect, the fluid bag can change the shape of the pad disposed in front of the shoulder support member. Thereby, the vehicle seat can support the shoulder portion of the seated person comfortably.

In the above aspect, preferably, the shoulder support member includes a support surface (32F) extending along a first direction and facing forward, a fluid supply device (53) is connected to the fluid bag assembly, one side in the first direction is referred to as a first side and another side in the first direction is referred to as a second side, the fluid bag assembly comprises: a first fluid bag (56) disposed on the support surface; a second fluid bag (57) which includes, in an end portion on the first side, a first joining part (61) joined to the first fluid bag, and communicates with the first fluid bag; and a third fluid bag (58) which includes, in an end portion on the first side, a second joining part (62) joined to the second fluid bag, and communicates with the second fluid bag, and in a state in which the fluid bag assembly is deflated, a first side edge (61A), which is a side edge of the first joining part on the second side, and a second side edge (62A), which is a side edge of the second joining part on the second side, each extend linearly and extend in mutually different directions, as seen in a direction perpendicular to the support surface.

According to this aspect, since the first side edge and the second side edge extend in mutually different directions, it is possible to vary the inflation direction of the second fluid bag and the inflation direction of the third fluid bag. Thereby, the shape of the fluid bag assembly when inflated can be diversified.

In the above aspect, preferably, the second side edge is disposed further on the second side than the first side edge.

According to this aspect, the shape of the fluid bag assembly when inflated can be diversified.

In the above aspect, preferably, a length of the second fluid bag in the first direction is longer than a length of the third fluid bag in the first direction.

According to this aspect, the shape of the fluid bag assembly when inflated can be diversified.

In the above aspect, preferably, the fluid supply device is connected to the first fluid bag, the first fluid bag and the second fluid bag are connected by a first communication hole (61B) passing through the first joining part, and the second fluid bag and the third fluid bag are connected by a second communication hole (62B) passing through the second joining part.

According to this aspect, the structure for connecting the air supply device and the fluid bag assembly can be made simple.

In the above aspect, preferably, the first fluid bag, the second fluid bag, and the third fluid bag extend in the first direction.

According to this aspect, the shape of the fluid bag assembly when deflated can be made simple.

In the above aspect, preferably, the first fluid bag includes a tab (56D) protruding to a side, and the tab is fastened to a side surface perpendicular to the support surface of the shoulder support member.

According to this aspect, the shoulder support can be made compact in size and the fluid bag assembly can be made compact in size.

In the above aspect, preferably, the shoulder support member includes a pair of left and right shoulder support members and the fluid bag assembly includes a pair of left and right fluid bag assemblies, the left and right shoulder support members are disposed on a left part and a right part of an upper portion of the seat back such that the first side is directed laterally inward and downward, and in the state in which the fluid bag assembly is deflated, each of the first side edge and the second side edge extends obliquely downward in a laterally outward direction, as seen from front.

According to this aspect, the fluid bag assemblies can make parts of the seat back corresponding to the shoulders of the seated person swell laterally inward and downward.

Thereby, a seat back in conformity with the position and shape of the shoulders of the seated person can be provided.

In the above aspect, preferably, the second plate part and the side member contact each other in the front-rear direction.

According to this aspect, the position of the second plate part in the seat back can be fixed.

In the above aspect, preferably, the second plate part extends along the side member as seen from front.

According to this aspect, since the second plate member exists between the shoulder portion of the seated person and the side member, the shoulder portion of the seated person can be supported comfortably.

In the above aspect, preferably, the second plate part includes a butting portion (37) that protrudes rearward in a rear portion thereof, and the second plate part contacts the side member at the butting portion.

According to this aspect, the second plate part and the side member can reliably contact each other.

In the above aspect, preferably, the second plate part and the side member contact each other in the front-rear direction via a cushioning material (38).

According to this aspect, the cushioning material prevents friction and rattling between the second plate part and the side member, whereby generation of noise is prevented.

In the above aspect, preferably, a rear surface of the second plate part is provided with a reinforcement structure (41).

According to this aspect, it is possible to improve the stiffness of the second plate part that contacts the side member.

In the above aspect, preferably, the wire member includes a pair of left and right wire members, and the shoulder support member includes a pair of left and right shoulder support members corresponding to the left and right wire members.

According to this aspect, the left and right shoulder support members can be displaced independently from each other so as to be along the shoulder portion of the seated person.

Thereby, a vehicle seat capable of supporting the shoulder portion of the seated person comfortably can be provided.

In the above aspect, preferably, a laterally inner side edge of the first plate part is inclined laterally outward toward an upward direction.

According to this aspect, a space can be formed between upper portions of the left and right shoulder supports. Devices such as a blower may be disposed in the space.

In the above aspect, preferably, a blower (46) is provided in a central portion of an upper portion of the seat back, and the left and right shoulder supports are disposed to left and right of the blower.

According to this aspect, the fluid bag assembly and the blower can be disposed within the seat back so as not to interfere with each other.

In the above aspect, preferably, the blower includes: a blower main body (36) provided with an impeller; and a duct (46B) extending from the blower main body, wherein the blower main body is disposed in the central portion of the upper portion of the seat back, the duct extends up and down on a side of the blower main body, and one of the left and right shoulder supports is disposed to left or right of the duct.

According to this aspect, the fluid bag assembly and the blower can be disposed within the seat back so as not to interfere with each other.

In the above aspect, preferably, one of left and right side portions of the seat back is provided with a first side airbag (48), another of the left and right side portions of the seat back is provided with a second side airbag (49), each of the first side airbag and the second side airbag extends up and down, an upper end of the first side airbag is positioned higher than an upper end of the second side airbag, and a lower end of each of the left and right shoulder supports is positioned higher than the upper end of the second side airbag.

According to this aspect, the fluid bag assembly and the side airbag can be disposed within the seat back so as not to interfere with each other.

In the above aspect, preferably, each of the left and right fluid bag assemblies has a recess that is recessed laterally outward on a laterally inner side edge thereof, and left and right side portions of the blower are disposed in the respective recesses.

According to this aspect, the fluid bag assemblies and the blower can be disposed at a high density.

MODE(S) FOR CARRYING OUT THE INVENTION

In the following, an embodiment in which a vehicle seat according to the present invention is applied to a seat of an automobile will be described with reference to the drawings. In the following description, an up-down direction is a direction along the vertical direction. Also, a front-rear direction is a direction perpendicular to the vertical direction, a direction in which the seat back is positioned relative to the seat cushion is a rearward direction, and the direction opposite to the rearward direction is a forward direction. Also, a lateral direction is a direction perpendicular to the up-down direction and the front-rear direction and is defined based on the forward direction.

Figure 1:
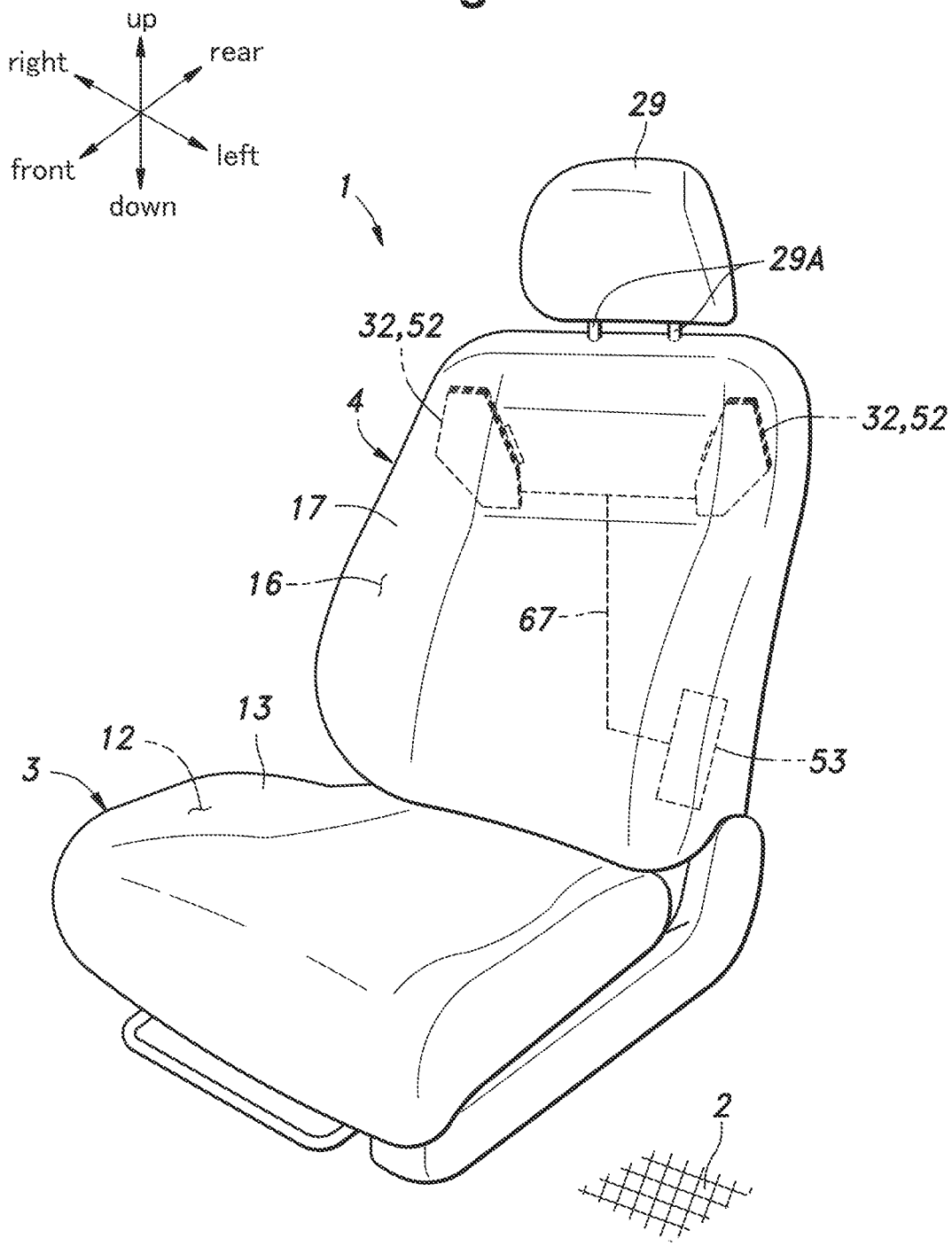
FIG. 1 is a perspective view of a seat according to an embodiment.
Figure 2:
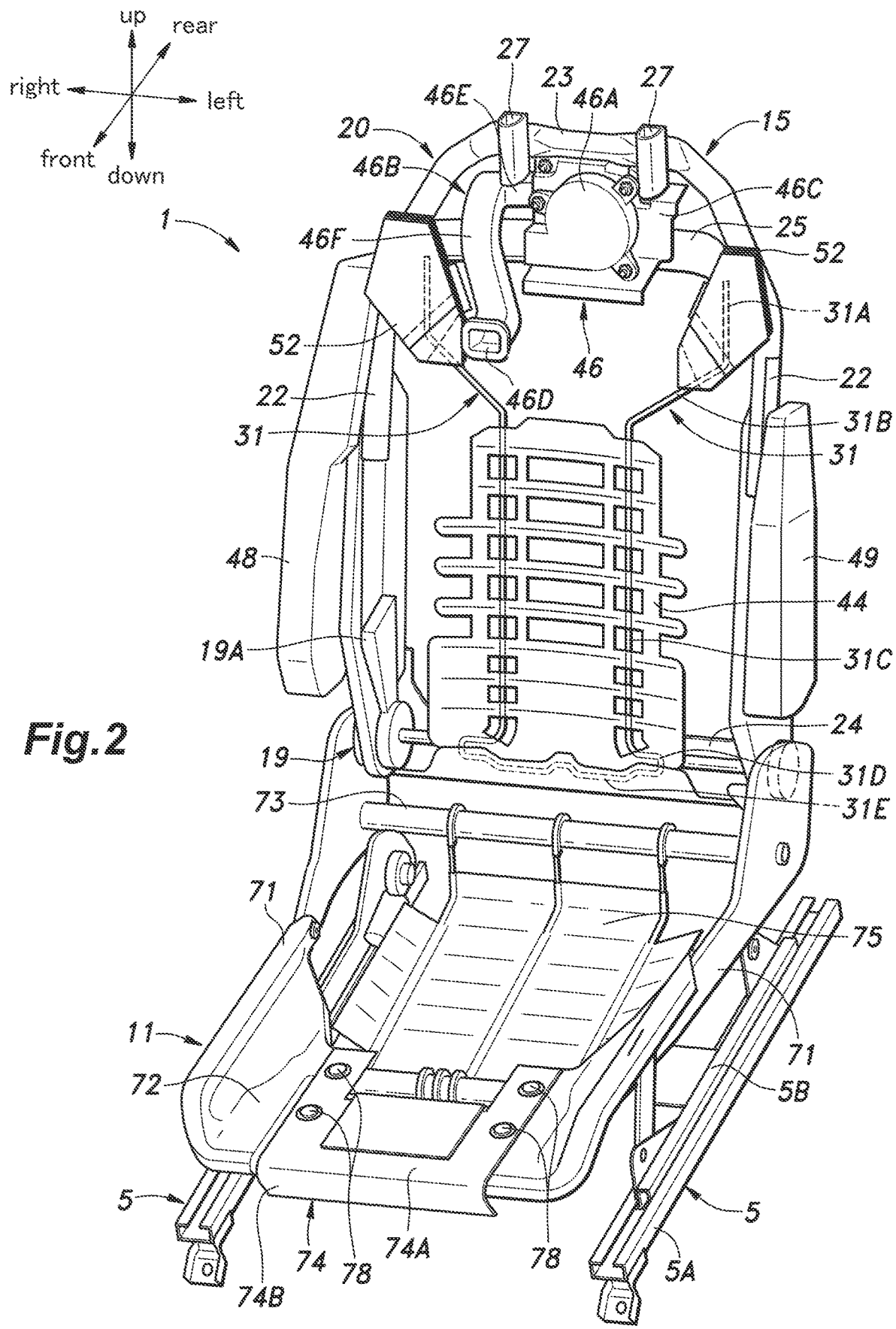
FIG. 2 is a perspective view of a frame of the seat according to the embodiment.

As shown in FIG. 1, a seat 1 includes a seat cushion 3 provided on a floor 2 of an automobile and a seat back 4 extending upward from a rear portion of the seat cushion 3. The seat cushion 3 supports the buttocks of an occupant and the seat back 4 supports the back of the occupant. As shown in FIG. 2, the seat cushion 3 may be provided on the floor 2 via a slide rail 5. The slide rail 5 includes left and right lower rails 5A joined to the floor 2 and left and right upper rails 5B supported by the left and right lower rails 5A, respectively, to be slidingly movable. The seat cushion 3 is joined to the left and right upper rails 5B. A lift device may be interposed between the seat cushion 3 and the upper rails 5B.

The seat cushion 3 includes a seat cushion frame 11 forming a skeleton, a pad 12 supported on the seat cushion frame 11, and a skin member 13 covering a surface of the pad 12. The seat back 4 includes a seat back frame 15 forming a skeleton, a pad 16 supported on the seat back frame 15, and a skin member 17 covering a surface of the pad 16. The seat cushion frame 11 and the seat back frame 15 are coupled to each other via a reclining device 19 and constitute a frame 20 of the seat 1. In the following description, the seat back 4 is disposed in an initial position in which the seat back 4 extends up and down.

Figure 3:
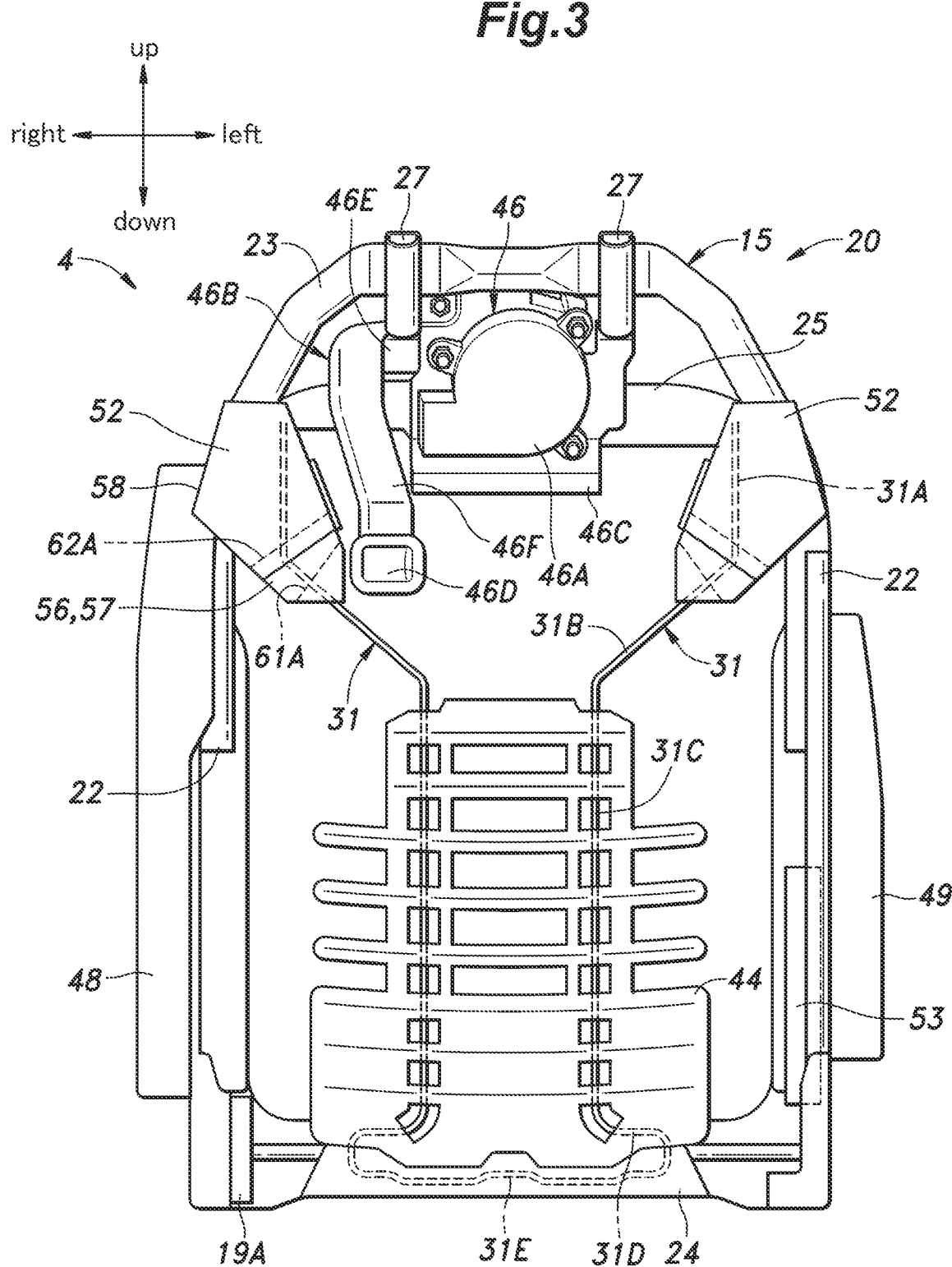
FIG. 3 is a front view of a seat back frame.

As shown in FIGS. 2 and 3, the seat back frame 15 includes left and right back side members 22 extending up and down, an upper cross member 23 extending laterally and joined to an upper end of each of the left and right back side members 22, a lower cross member 24 extending laterally and joined to a lower portion of each of the left and right back side members 22, and a middle cross member 25 extending laterally between the upper cross member 23 and the lower cross member 24 and joined to each of the left and right back side members 22.

The lower portions of the left and right back side members 22 are formed of sheet metal members having surfaces facing left and right. The upper portions of the left and right back side members 22 and the upper cross member 23 are formed of a continuous pipe member. The pipe member includes a laterally extending central portion and left and right end portions bent relative to the central portion and extending downward. The left and right end portions of the pipe member are joined to surfaces of the left and right sheet metal members that face laterally inward.

The upper cross member 23 is provided with a pair of left and right headrest support members 27. Each of the headrest support members 27 is formed in a tubular shape and extends up and down. Each of the headrest support members 27 is joined to the front surface of the upper cross member 23 by welding or the like. The headrest support members 27 are disposed in a laterally central portion of the upper cross member 23 to be spaced laterally. A resin collar (not shown in the drawings) is fitted on each of the headrest support members 27. A pair of left and right pillars 29A (see FIG. 1) that extend from the headrest 29 are inserted into the headrest support members 27 via the collars and are supported thereby.

As shown in FIGS. 2 and 3, the seat back frame 15 includes at least one wire member 31 extending up and down and joined to the lower cross member 24 and the middle cross member 25. In the present embodiment, a pair of left and right wire members 31 is provided. Each wire member 31 is made of a metal rod and has flexibility. The left and right wire members 31 each include a first portion and a second portion that are inclined relative to each other via a bending portion. In the present embodiment, the left and right wire members 31 each include an upper end portion 31A joined to one of the left and right end portions of the middle cross member 25 and extending downward, an upper intermediate portion 31B extending from the lower end of the upper end portion 31A laterally inward and downward in an oblique manner, a lower intermediate portion 31C extending downward from the lower end of the upper intermediate portion 31B, and a lower end portion 31D extending from the lower end of the lower intermediate portion 31C laterally outward and downward and joined to the lower cross member 24. The upper end portion 31A and the upper intermediate portion 31B are inclined relative to each other via a bending portion. Thus, the upper end portion 31A corresponds to the first portion, and the upper intermediate portion 31B corresponds to the second portion. The left and right lower end portions 31D may be joined to each other by a connecting portion 31E.

Figure 4:
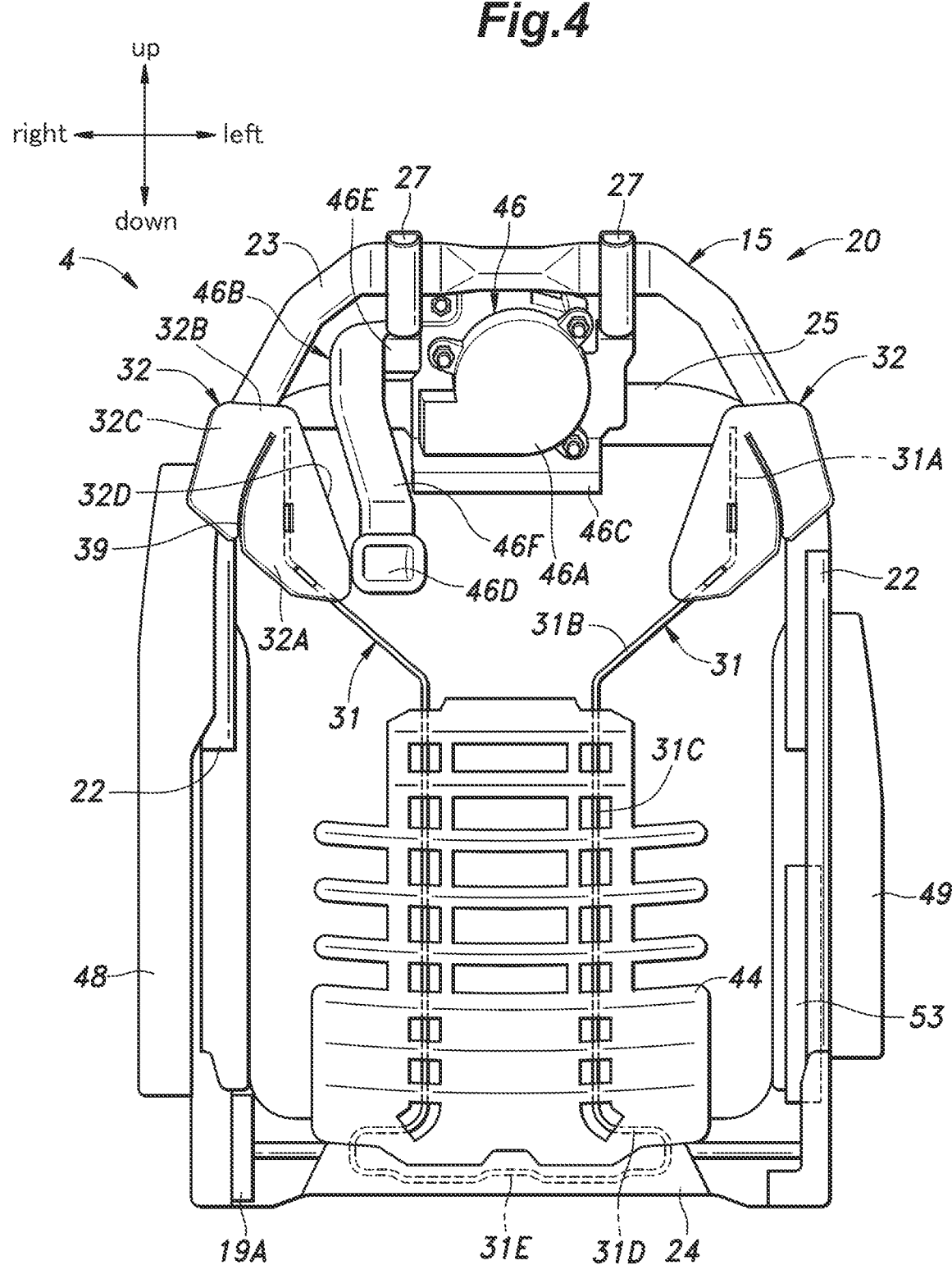
FIG. 4 is a front view of the seat back frame with fluid bags omitted.

As shown in FIG. 4, at least one shoulder support member 32 is provided on the upper portions of the wire members 31. In the present embodiment, a pair of left and right shoulder support members 32 are provided on the laterally corresponding wire members 31.

The left and right shoulder support members 32 are preferably made of metal or resin, for example. In the present embodiment, the shoulder support members 32 are made of resin. The left and right shoulder support members 32 are formed in bilaterally symmetrical shapes. In the following, description will be made of the right shoulder support member 32.

Figure 5:
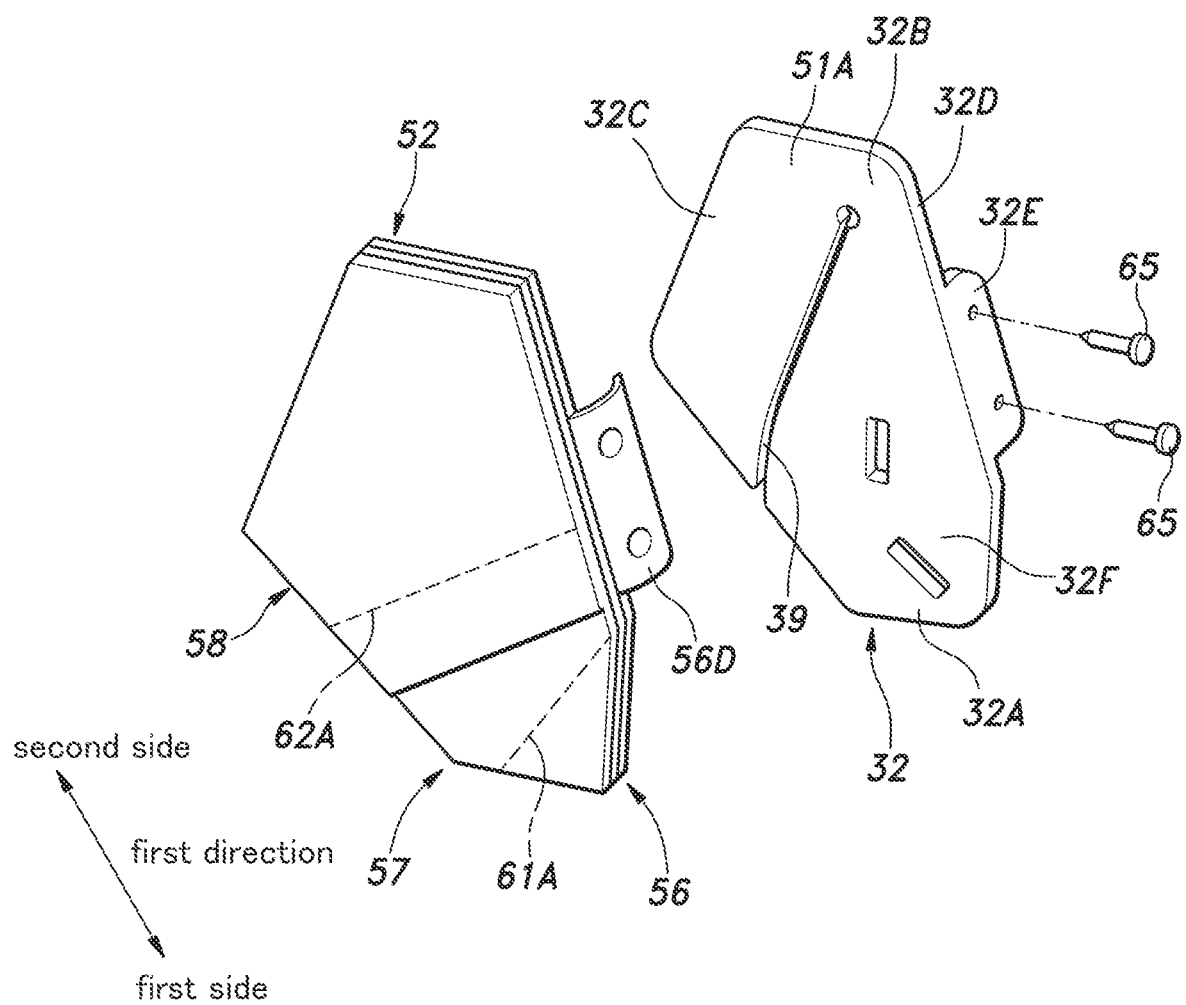
FIG. 5 is a perspective view showing a fluid bag assembly and a shoulder support member.
Figure 6:
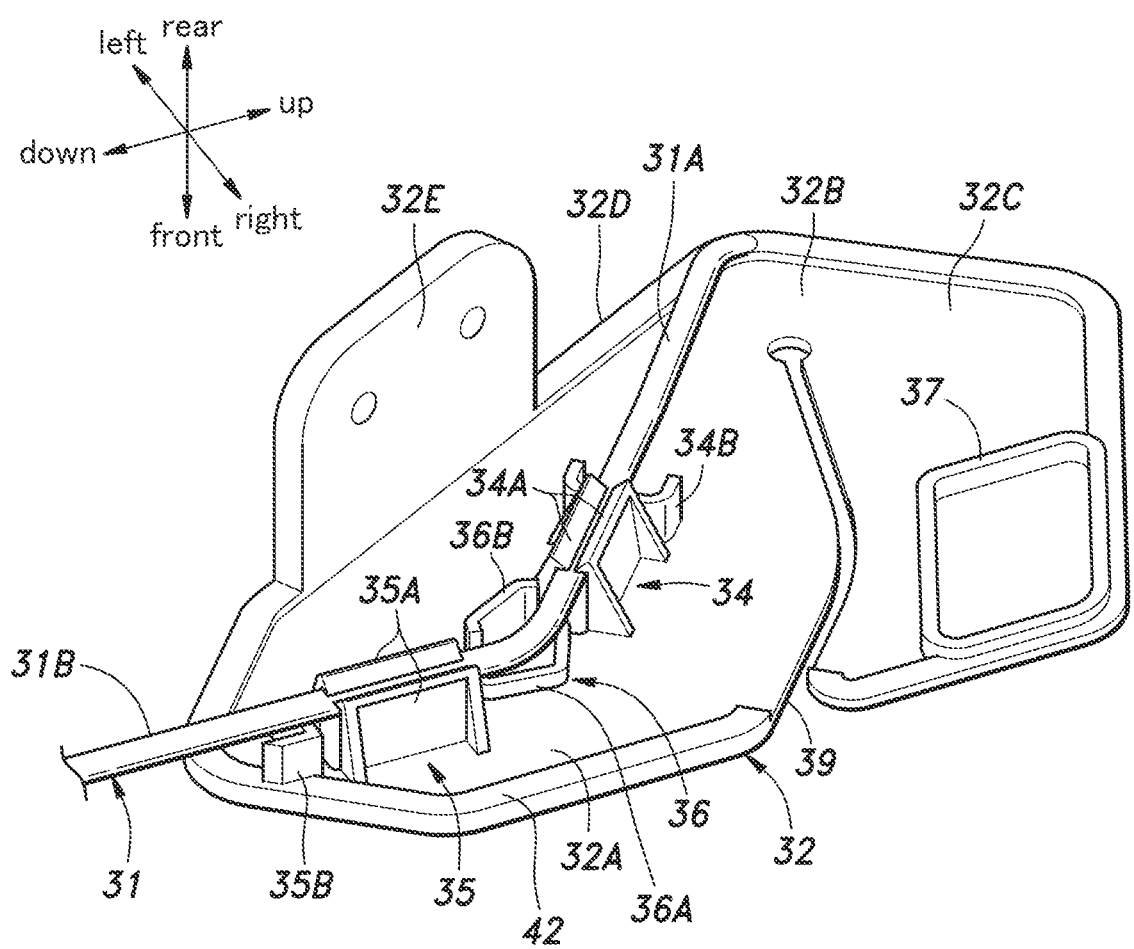
FIG. 6 is a perspective view showing a rear surface of the shoulder support member.
Figure 7:
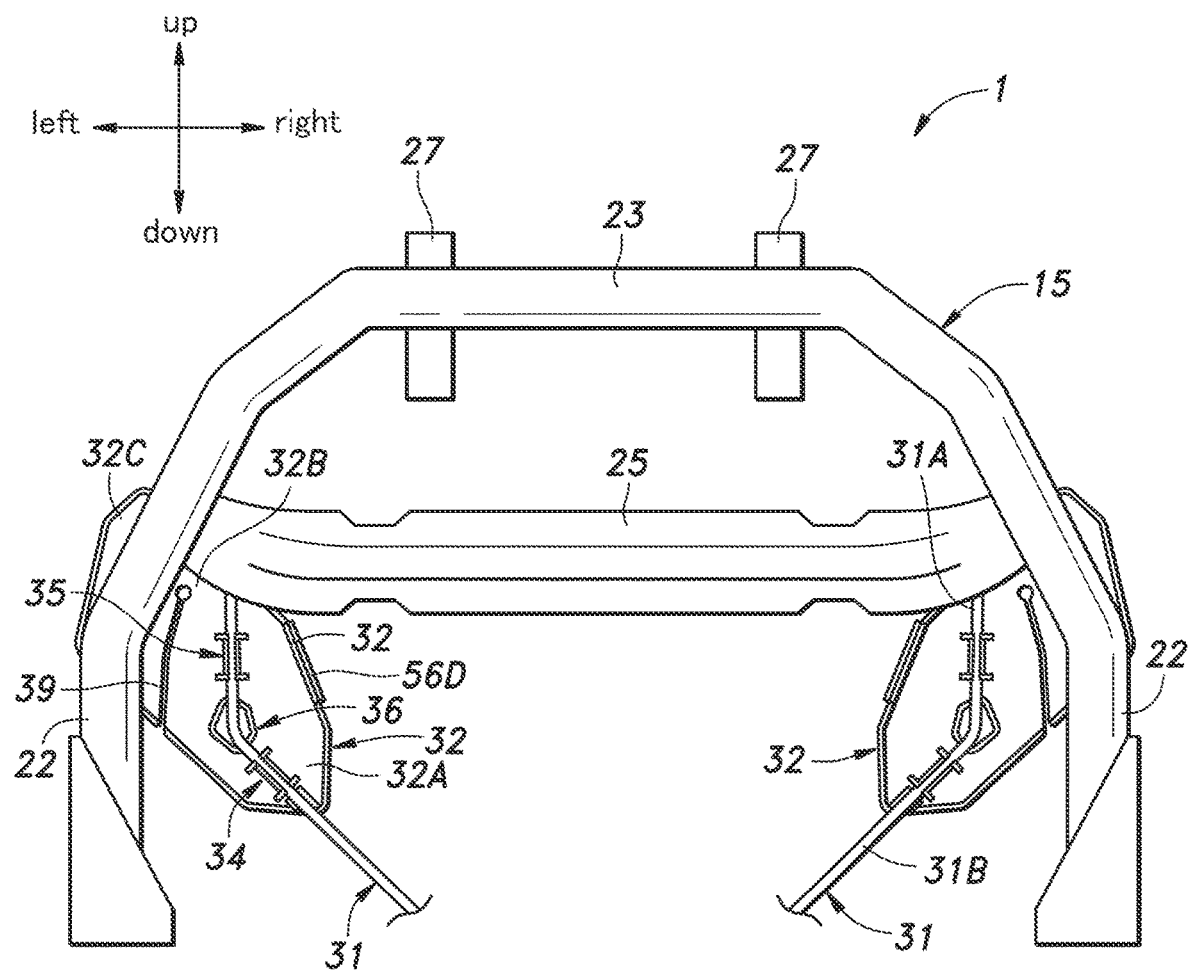
FIG. 7 is a rear view of an upper portion of the seat back frame.

As shown in FIGS. 4 to 6, the shoulder support member 32 includes a first plate part 32A facing in the front-rear direction and joined to the upper portion of the wire member 31 and a second plate part 32C facing in the front-rear direction and connected to the first plate part 32A via a flexible part 32B. In the right shoulder support member 32, the first plate part 32A extends obliquely rightward and upward, the second plate part 32C is disposed to the right and extends up and down, and the flexible part 32B extends up and down between the first plate part 32A and the second plate part 32C. A laterally inner side edge 32D of the first plate part 32A is inclined laterally outward toward the upward direction. The inner side edge 32D of the first plate part 32A is provided with a plate-shaped fastening part 32E that protrudes rearward. The fastening part 32E extends along the inner side edge 32D.

The flexible part 32B has a flexibility higher than the flexibilities of the first plate part 32A and the second plate part 32C. With elastic deformation of the flexible part 32B, the first plate part 32A can be displaced relative to the second plate part 32C.

As shown in FIG. 6, the first plate part 32A includes a first locking portion 34 that lock the upper end portion 31A as the first portion and a second locking portion 35 that locks the upper intermediate portion 31B as the second portion. Further, the first plate part 32A includes a positioning part 36 between the first locking portion 34 and the second locking portion 35 such that the positioning part 36 contacts the upper end portion 31A and the upper intermediate portion 31B. The first locking portion 34 includes a pair of first elastic claws 34A protruding rearward from the rear surface of the first plate part 32A and a first contact part 34B protruding rearward from the rear surface of the first plate part 32A. The pair of first elastic claws 34A oppose each other and sandwich the upper end portion 31A between them. The first contact part 34B contacts the upper end portion 31A sandwiched between the pair of first elastic claws 34A from the front thereby to determine the position of the first plate part 32A relative to the upper end portion 31A. The pair of first elastic claws 34A extend in the up-down direction.

The second locking portion 35 includes a pair of second elastic claws 35A protruding rearward from the rear surface of the first plate part 32A and a second contact part 35B protruding rearward from the rear surface of the first plate part 32A. The pair of second elastic claws 35A oppose each other and sandwich the upper intermediate portion 31B between them. The second contact part 35B contacts the upper intermediate portion 31B sandwiched between the pair of second elastic claws 35A from the front thereby to determine the position of the first plate part 32A relative to the upper intermediate portion 31B. The pair of second elastic claws 35A extend laterally inward and downward along the upper intermediate portion 31B.

The positioning part 36 includes a tubular base portion 36A protruding rearward from the rear surface of the first plate part 32A and a wall portion 36B protruding further rearward from a part of the rear end edge of the base portion 36A. As seen from the rear, the wall portion 36B extends up and down and is curved to be convex laterally inward. With the rear end edge of the base portion 36A contacting the upper end portion 31A and the upper intermediate portion 31B from the front, the upper end edge of the wall portion 36B contacting the upper end portion 31A from the left, and the lower end edge of the wall portion 36B contacting the upper intermediate portion 31B from above and left, the position of the shoulder support member 32 relative to the wire member 31 is fixed.

As shown in FIG. 4, as seen from front, the first plate part 32A and the flexible part 32B are disposed between the left and right back side members 22, and at least a part of the second plate part 32C is disposed in front of the right back side member 22. Preferably, the second plate part 32C extends along the right back side member 22 As seen from front. The second plate part 32C and the right back side member 22 contact each other in the front-rear direction. The second plate part 32C includes a butting portion 37 that protrudes rearward in a rear portion thereof, and the second plate part 32C contacts the right back side member 22 at the butting portion 37. Preferably, the butting portion 37 is formed in a tubular shape extending rearward and contacts the front surface of the right back side member 22 at the rear end edge.

Preferably, the flexible part 32B extends up and down along a laterally inner side edge of the right back side member 22 as seen from front. In the present embodiment, the flexible part 32B has a slit 39 penetrating therethrough in the front-rear direction and extending up and down with a lower end opened. Due to the slit 39, the first plate part 32A and the second plate part 32C are connected to each other at the upper end portions thereof via the flexible part 32B. Thereby, the first plate part 32A can be displaced forward and rearward relative to the lower portion of the second plate part 32C.

An edge wall 42 that protrudes rearward may be provided on the edge part of the first plate part 32A and the second plate part 32C. The edge wall 42 improves the stiffness of the first plate part 32A and the second plate part 32C.

A lumber support member 44 having a plate shape and facing in the front-rear direction is supported on the lower portions of the wire members 31. Namely, the left and right shoulder support members 32 are disposed on the lumber support member 44. The lumber support member 44 is disposed in a lower portion of the seat back 4 and supports the hip of the occupant. Preferably, the lumber support member 44 is made of resin.

In the central portion of the upper portion of the seat back 4, a blower 46 is provided. The blower 46 includes a blower main body 46A provided with an impeller and a duct 46B extending from the blower main body 46A. The blower 46 is mounted to a bracket 46C that is joined to at least one of the upper cross member 23 and the middle cross member 25. In the present embodiment, the bracket 46C extends up and down and has an upper end joined to a laterally central portion of the upper cross member 23 and a lower end joined to a laterally central portion of the middle cross member 25. The blower main body 46A may be a centrifugal fan, for example. The blower main body 46A is formed in a flat cylindrical shape and is fixed to the front surface of the bracket 46C such that the axis thereof extends in the front-rear direction. The blower main body 46A is disposed in the central portion of the upper portion of the seat back 4. More specifically, the blower main body 46A is disposed between the upper cross member 23 and the middle cross member 25. Also, the blower main body 46A is preferably disposed between the left and right headrest support members 27 with respect to the lateral direction. Further, the blower 46 is disposed between the left and right shoulder support members 32.

The duct 46B has one end joined to the central portion of the rear surface of the blower main body 46A and another end forming a suction port 46D. The duct 46B includes a lateral part 46E extending from the one end rightward behind the bracket 46C and the right headrest support member 27 and a vertical part 46F extending from the right end of the lateral part 46E downward and forward. Namely, the duct 46B extends up and down on the side of the blower main body 46A. The suction port 46D is provided at the lower end of the vertical part 46F. The vertical part 46F extends up and down at a position to the right of the blower main body 46A, and the suction port 46D is positioned lower than the lower end of the blower main body 46A. In another embodiment, the lateral part 46E may extend leftward from the one end so that the vertical part 46F is disposed to the left of the blower main body 46A. In the present embodiment, the blower main body 46A takes in air from the central portion via the duct 46B and discharges air from an outer circumferential portion. A duct through which the discharged air flows (not shown in the drawings) may be connected to the outer circumferential portion of the blower main body 46A. In another embodiment, the duct 46B may be omitted and the blower main body 46A may take in air directly.

One of the left and right side portions of the seat back 4 is provided with a first side airbag 48, and the other of the left and right side portions of the seat back 4 is provided with a second side airbag 49. In the present embodiment, the first side airbag 48 is provided on the right side surface of the right back side member 22, and the second side airbag 49 is provided on the left side surface of the left back side member 22. Each of the first side airbag 48 and the second side airbag 49 extends up and down. The upper end of the first side airbag 48 is positioned higher than the upper end of the second side airbag 49. Also, the first side airbag 48 is formed to be longer than the second side airbag 49 in the up-down direction. In the present embodiment, the seat 1 is a left seat of the vehicle, the first side airbag 48 is a far side airbag that is remote from the side wall of the vehicle, and the second side airbag 49 is a near side airbag that is close to the side wall of the vehicle.

In the seat 1, fluid bag assemblies 52 that inflate and deflate are disposed between the frame 20 and the skin members 13, 17. The fluid bag assemblies 52 are provided on the front surfaces of the shoulder support members 32. In the present embodiment, a single fluid supply device 53 is connected to the left and right fluid bag assemblies 52. The left fluid bag assembly 52 is disposed between the left shoulder support member 32 and the pad 16, and the right fluid bag assembly 52 is disposed between the right shoulder support member 32 and the pad 16. In the present embodiment, the fluid supplied to the fluid bag assembly 52 is air, and the fluid supply device 53 includes an air pump. In another embodiment, the fluid may be a liquid such as water or oil. The fluid supply device 53 is preferably provided on the inner side surface of one of the left and right back side members 22. Preferably, a driving device 19A for driving the reclining device 19 is provided on the inner side surface of the other of the left and right back side members 22. Namely, the fluid supply device 53 and the driving device 19A are provided on the inner side surfaces of the different back side members 22. Preferably, the driving device 19A includes an electric motor and a speed reduction mechanism.

The shoulder support members 32 each include a support surface 32F extending along a first direction and facing forward. The support surface F is consisted of the front surfaces of the first plate part 32A, the flexible part 32B, and the second plate part 32C. Here, one side in the first direction is referred to as a first side and another side in the first direction is referred to as a second side. In the present embodiment, the left and right shoulder support members 32 are disposed on a left part and a right part of an upper portion of the seat back 4 such that the respective support surfaces 32F face forward and the first side is directed laterally inward and downward. Each shoulder support member 32 includes a side surface 51B perpendicular to the support surface 32F. In the present embodiment, the shoulder support member 32 extends in the first direction.

The left and right shoulder support members 32 are disposed to the left and right of the blower 46, respectively. Also, the left and right shoulder support members 32 are provided to the left and right of the duct 46B. The right shoulder support member 32 is disposed to the right of the duct 46B, and the left shoulder support member 32 is disposed to the left of the duct 46B. Preferably, the lower ends of the left and right shoulder support members 32 are each positioned higher than the upper end of the lumber support member 44. Also, preferably, the lower ends of the left and right shoulder support members 32 are each positioned higher than the upper end of the second side airbag 49.

Figure 8:
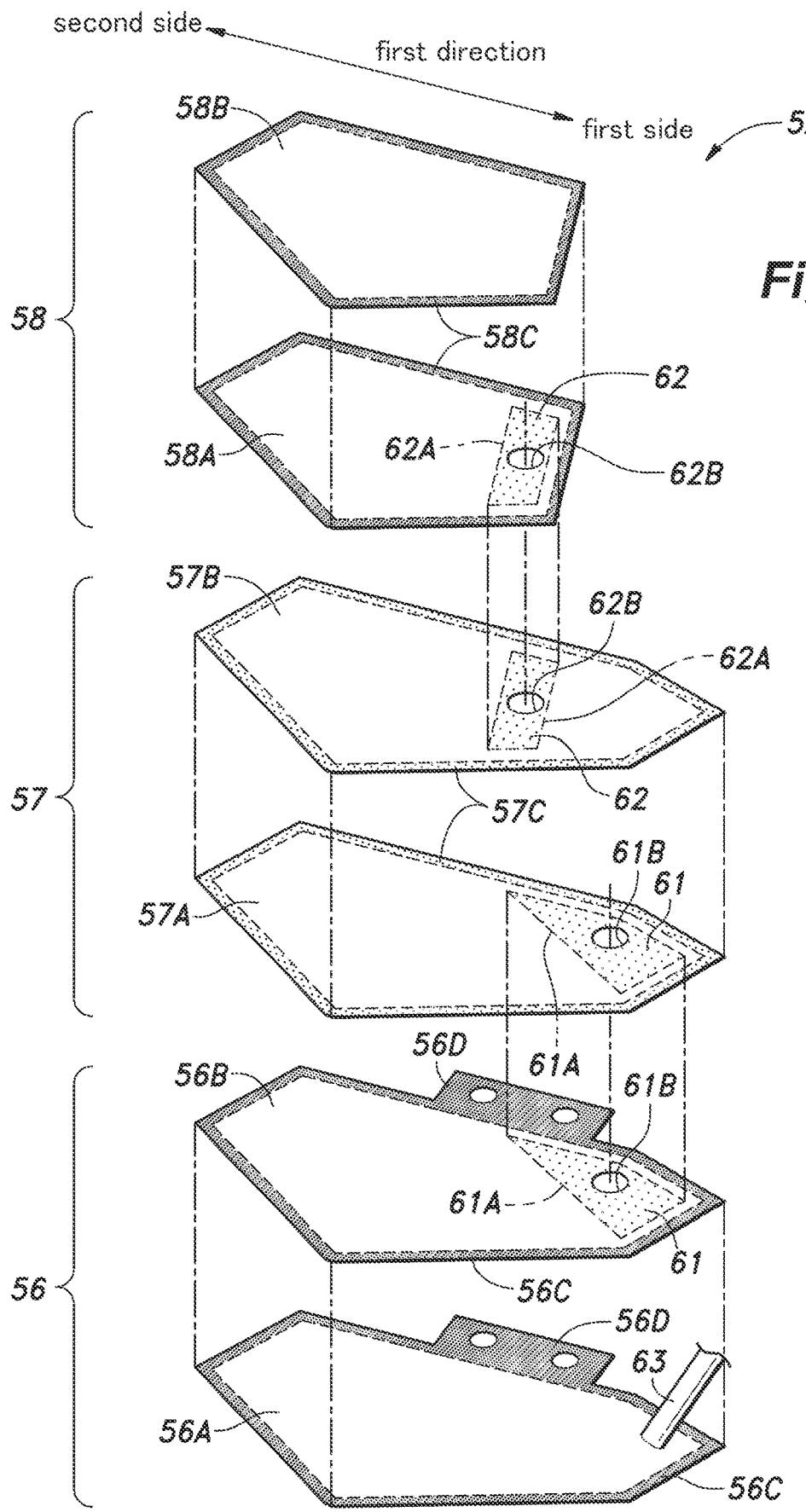
FIG. 8 is an exploded perspective view of the fluid bag assembly.

As shown in FIGS. 5 and 8, the fluid bag assembly 52 includes a first fluid bag 56, a second fluid bag 57, and a third fluid bag 58. The first fluid bag 56 is disposed on the support surface 32F of the shoulder support member 32. The second fluid bag 57 includes, in an end portion on the first side, a first joining part 61 joined to the first fluid bag 56, and communicates with the first fluid bag 56. The third fluid bag 58 includes, in an end portion on the first side, a second joining part 62 joined to the second fluid bag 57, and communicates with the second fluid bag 57. Each of the first to third fluid bags 56 to 58 is formed by welding edge parts of superposed sheet materials. For example, the fluid bag may be formed of two sheet materials that are mutually superposed and the edge parts thereof are bonded to each other. Also, the fluid bag may be formed of a single sheet material that is folded such that the folded portions are superposed and the edge parts thereof are bonded to each other.

The first fluid bag 56 includes a first sheet 56A and a second sheet 56B that are mutually superposed. The first sheet 56A and the second sheet 56B are joined to each other by a third joining part 56C which extends along the respective edge parts and forms a closed ring shape. The third joining part 56C preferably is a part where the first sheet 56A and the second sheet 56B are welded or adhered to each other. Between the edge parts of the first sheet 56A and the second sheet 56B, an introduction pipe 63, which is a pipe having both ends opened, is interposed so as to cross the third joining part 56C. The outer circumferential surface of the introduction pipe 63, the first sheet 56A, and the second sheet 56B are sealed airtightly.

The first fluid bag 56 contacts the support surface 32F at the first sheet 56A and extends in the first direction. At least one of the first sheet 56A and the second sheet 56B includes a tab 56D that protrudes laterally in an intermediate portion in the first direction. In the present embodiment, the tab 56D is provided on a laterally inner side edge of an intermediate portion of each of the first sheet 56A and the second sheet 56B in the first direction. The tabs 56D of the first sheet 56A and the second sheet 56B are preferably joined to other. The tabs 56D are bent to be along the fastening part 32E of the shoulder support member 32 and are fastened to the fastening part 32E by means of a fastening member 65 such as a clip or a rivet. The first fluid bag 56 is fixed to the shoulder support member 32 via the tabs 56D. As seen in a direction perpendicular to the support surface 32F of the shoulder support member 32, the end portion of the first fluid bag 56 on the first side is disposed in a position coinciding with the end portion of the shoulder support member 32 on the first side, and the end portion of the first fluid bag 56 on the second side is disposed in a position coinciding with the end portion of the shoulder support member 32 on the second side.

The second fluid bag 57 includes a third sheet 57A and a fourth sheet 57B that are mutually superposed. The third sheet 57A and the fourth sheet 57B are joined to each other by a fourth joining part 57C which extends along the respective edge parts and forms a closed ring shape. The fourth joining part 57C preferably is a part where the third sheet 57A and the fourth sheet 57B are welded or adhered to each other. The second fluid bag 57 extends in the first direction and is superposed on the first fluid bag 56. The third sheet 57A of the second fluid bag 57 contacts the second sheet 56B of the first fluid bag 56. As seen in a direction perpendicular to the support surface 32F of the shoulder support member 32, the end portion of the second fluid bag 57 on the first side is disposed in a position coinciding with the end portion of the first fluid bag 56 on the first side, the end portion of the second fluid bag 57 on the second side is disposed in a position coinciding with the end portion of the first fluid bag 56 on the second side.

The end portion of the third sheet 57A on the first side and the end portion of the second sheet 56B on the first side are joined to each other by the first joining part 61. The first joining part 61 preferably is a part where the third sheet 57A and the second sheet 56B are welded or adhered to each other. The first joining part 61 has a first side edge 61A which is a side edge on the second side. The first side edge 61A extends linearly. The first fluid bag 56 and the second fluid bag 57 are connected by a first communication hole 61B that passes through the first joining part 61. The first communication hole 61B is formed in the second sheet 56B and the third sheet 57A.

The third fluid bag 58 includes a fifth sheet 58A and a sixth sheet 58B that are mutually superposed. The fifth sheet 58A and the sixth sheet 58B are joined to each other by a fifth joining part 58C which extends along the respective edge parts and forms a closed ring shape. The fifth joining part 58C preferably is a part where the fifth sheet 58A and the sixth sheet 58B are welded or adhered to each other. The third fluid bag 58 extends in the first direction and is superposed on the second fluid bag 57. The fifth sheet 58A of the third fluid bag 58 contacts the fourth sheet 57B of the second fluid bag 57. As seen in a direction perpendicular to the support surface 32F of the shoulder support member 32, the end portion of the third fluid bag 58 on the first side is offset to the second side relative to the end portion of the second fluid bag 57 on the first side, and the end portion of the third fluid bag 58 on the second side is disposed in a position coinciding with the end portion of the second fluid bag 57 on the second side. Namely, the length of the second fluid bag 57 in the first direction is longer than the length of the third fluid bag 58 in the first direction.

The end portion of the fifth sheet 58A on the first side and an intermediate portion of the fourth sheet 57B in the first direction are joined to each other by a second joining part 62. The second joining part 62 preferably is a part where the fourth sheet 57B and the fifth sheet 58A are welded or adhered to each other. The second joining part 62 has a second side edge 62A which is a side edge on the second side. The second side edge 62A extends linearly. The second fluid bag 57 and the third fluid bag 58 are connected by a second communication hole 62B that passes through the second joining part 62. The second communication hole 62B is formed in the fourth sheet 57B and the fifth sheet 58A.

The introduction pipes 63 of the left and right fluid bag assemblies 52 are connected to the fluid supply device 53 via tubes 67. The fluid bag assemblies 52 inflates when the fluid is supplied and deflates when the fluid is discharged.

Figure 9:
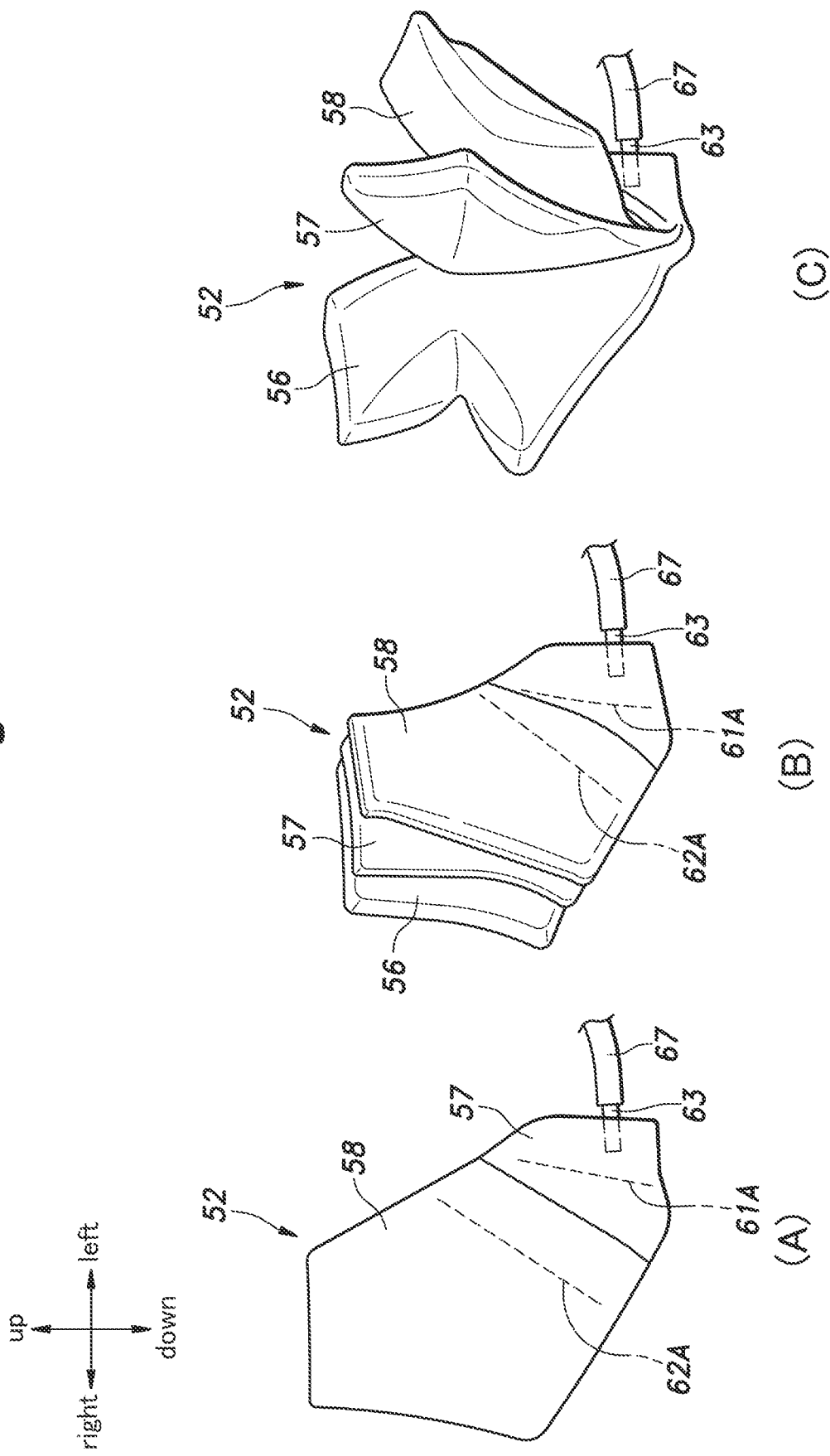
FIG. 9 is an explanatory diagram for showing the fluid bag assembly (A) in a deflated state, (B) in a partially inflated state, (C) in an inflated state.

As shown in FIG. 3 and FIG. 9(A), in the state in which the fluid bag assembly 52 is deflated, the first side edge 61A and the second side edge 62A extend in mutually different directions as seen in a direction perpendicular to the support surface 32F of the shoulder support member 32. Namely, as seen in a direction perpendicular to the support surface 32F of the shoulder support member 32, an angle defined between the first side edge 61A and the first direction differs from an angle defined between the second side edge 62A and the first direction. Also, the second side edge 62A is disposed further on the second side than the first side edge 61A.

The first side edge 61A and the second side edge 62A is preferably positioned lower than the central axis of the blower main body 46A. Also, the first side edge 61A and the second side edge 62A are preferably positioned lower than the upper end of the first side airbag 48. Further, the upper end of the fluid bag assembly 52 is preferably positioned lower than the central axis of the blower main body 46A. Also, the upper end of the fluid bag assembly 52 is preferably positioned lower than the upper end of the first side airbag 48.

The first to third fluid bags 56 to 58 each have a planar shape and are mutually superposed in the deflated state. When the fluid supply device 53 is driven and air is supplied to the fluid bag assembly 52, the fluid bag assembly 52 inflates. The air supplied from the fluid supply device 53 via the tube 67 flows into the first fluid bag 56 by passing through the introduction pipe 63, flows from the first fluid bag 56 into the second fluid bag 57 by passing through the first communication hole 61B, and flows from the second fluid bag 57 into the third fluid bag 58 by passing through the second communication hole 62B. Thereby, the fluid bag assembly 52 inflates.

Figure 10:
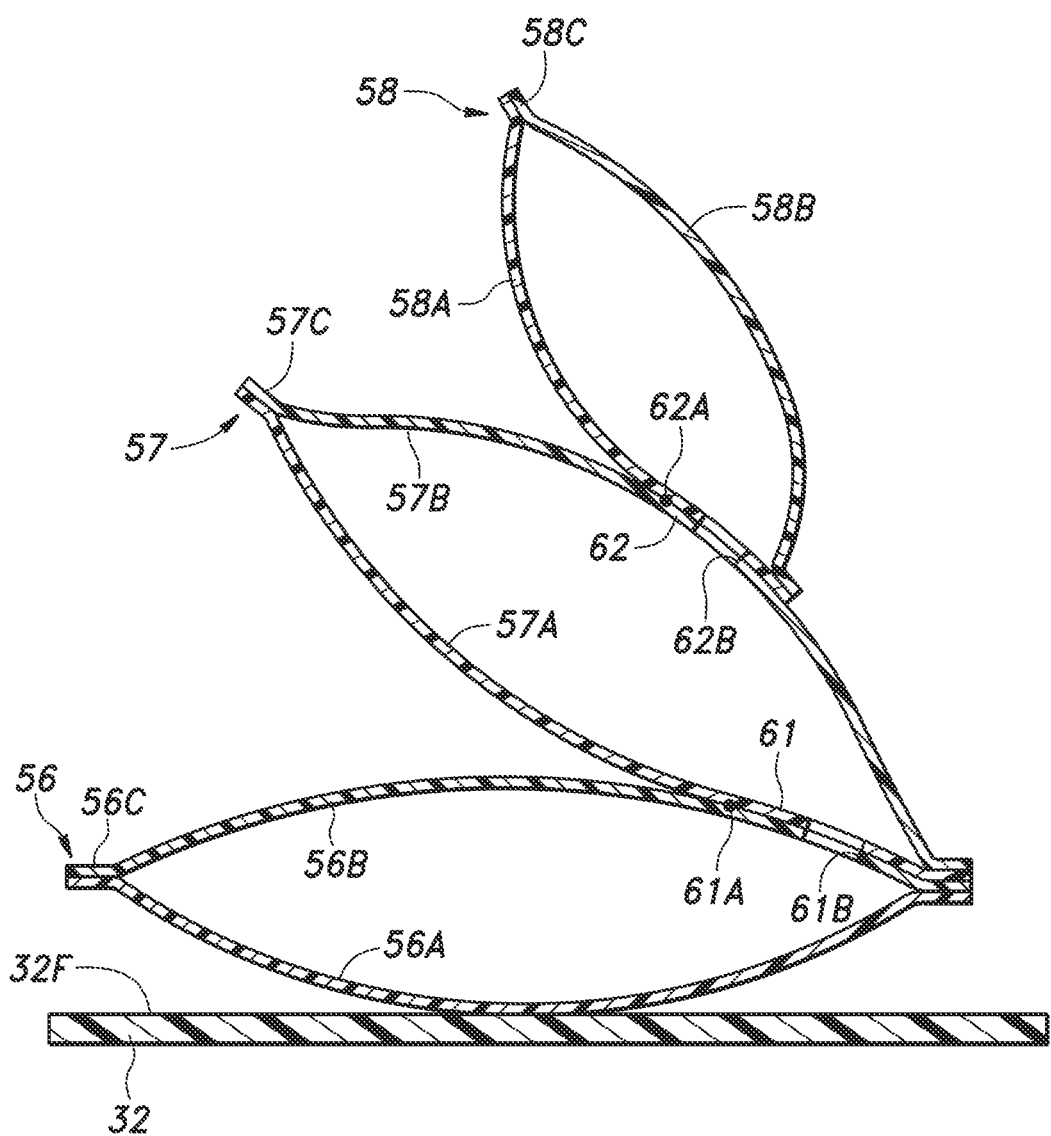
FIG. 10 is a sectional view of the fluid bag assembly in the inflated state.

In the inflated state, the thickness of each of the first to third fluid bags 56 to 58 gradually increases from the edge part toward the central portion. As a result, as shown in FIG. 10, in the inflated state, the second fluid bag 57 is bent about the first side edge 61A so that the end portion of the second fluid bag 57 on the second side is separated from the end portion of the first fluid bag 56 on the second side. Also, the third fluid bag 58 is bent about the second side edge 62A so that the end portion of the third fluid bag 58 on the second side is separated from the end portion of the second fluid bag 57 on the second side. Thereby, the end portion of the fluid bag assembly 52 on the second side spreads more in a direction perpendicular to the support surface 32F of the shoulder support member 32 than the end portion of the same on the first side.

In the state in which the left and right fluid bag assemblies 52 is deflated, each of the first side edge 61A and the second side edge 62A extends obliquely downward in the laterally outward direction, as seen from front. Thereby, at the time of inflation, the end portion of the second fluid bag 57 on the second side moves or rotates laterally inward and downward about the first side edge 61A. Likewise, at the time of inflation, the end portion of the third fluid bag 58 on the second side moves or rotates laterally inward and downward about the second side edge 62A. Since the first side edge 61A and the second side edge 62A extend in mutually different directions, the end portion of the second fluid bag 57 on the second side and the end portion of the third fluid bag 58 on the second side move in different directions. In the present embodiment, at the time of inflation, the end portion of the second fluid bag 57 on the second side moves forward and laterally inward and downward, and the end portion of the third fluid bag 58 on the second side moves forward and laterally inward. Thereby, the fluid bag assembly 52 inflates as shown in FIGS. 9(A) to 9(C).

As shown in FIG. 2, the seat cushion frame 11 includes left and right cushion side members 71 extending in the front-rear direction, a front member 72 extending laterally and coupling the front ends of the left and right cushion side members 71 to each other, a rear member 73 extending laterally and coupling the rear ends of the left and right cushion side members 71 to each other, and a movable frame 74 supported on the front member 72 to be movable forward and rearward. Between the front member 72 and the rear member 73, a buttocks support 75 for supporting the buttocks of the occupant extends. The buttocks support 75 preferably includes a plate-shaped member made of resin and multiple wire springs joined to the plate-shaped member.

The movable frame 74 includes an upper plate 74A provided on the upper surface of the front member 72 and supported to be movable forward and rearward relative to the front member 72 and a front plate 74B extending downward from the front end of the upper plate 74A to be disposed in front of the front member 72. The left end and the right end of the rear portion of the upper plate 74A extend rearward than the central part of the same. The front plate 74B is formed in an arc shape that is convex forward as seen in the lateral direction.

Figure 12:
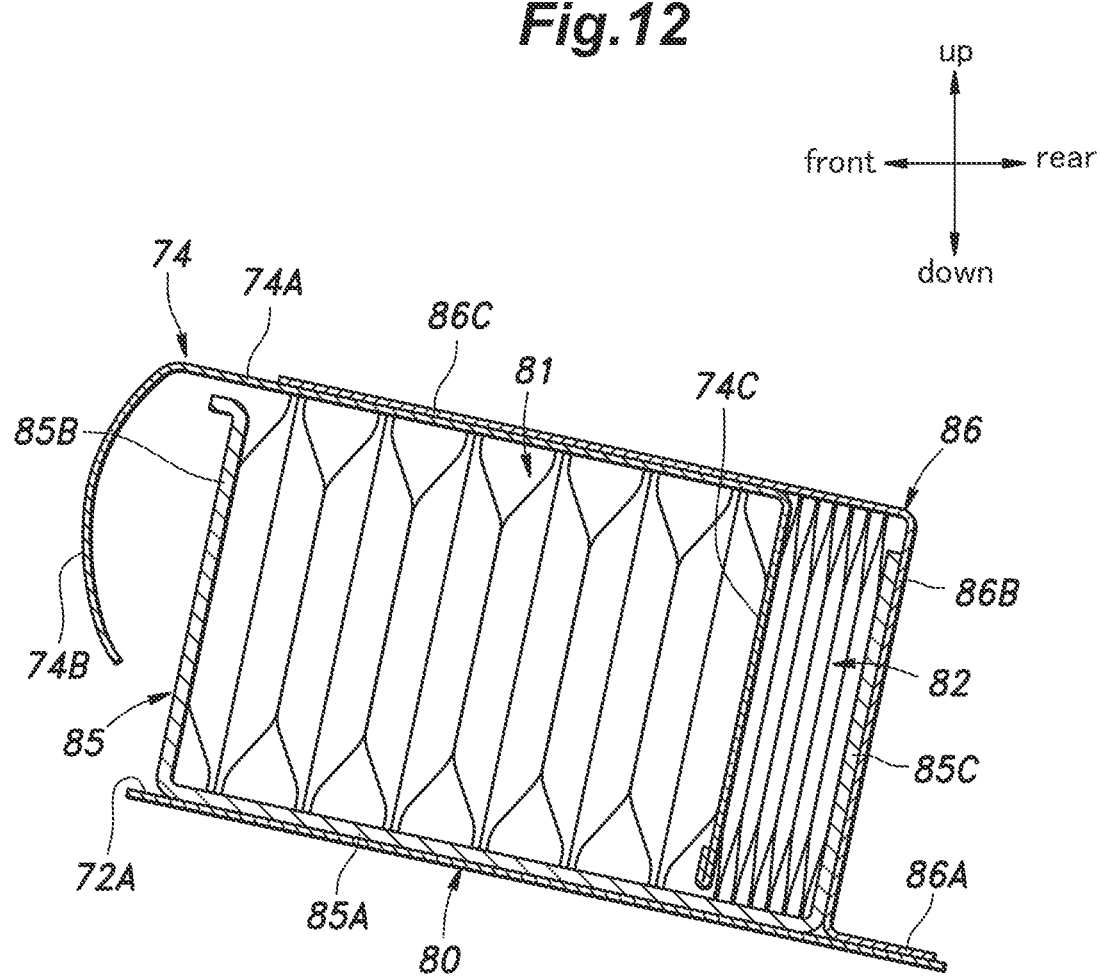
FIG. 12 is a sectional view of the fluid bag assembly in the inflated state.
Figure 13:
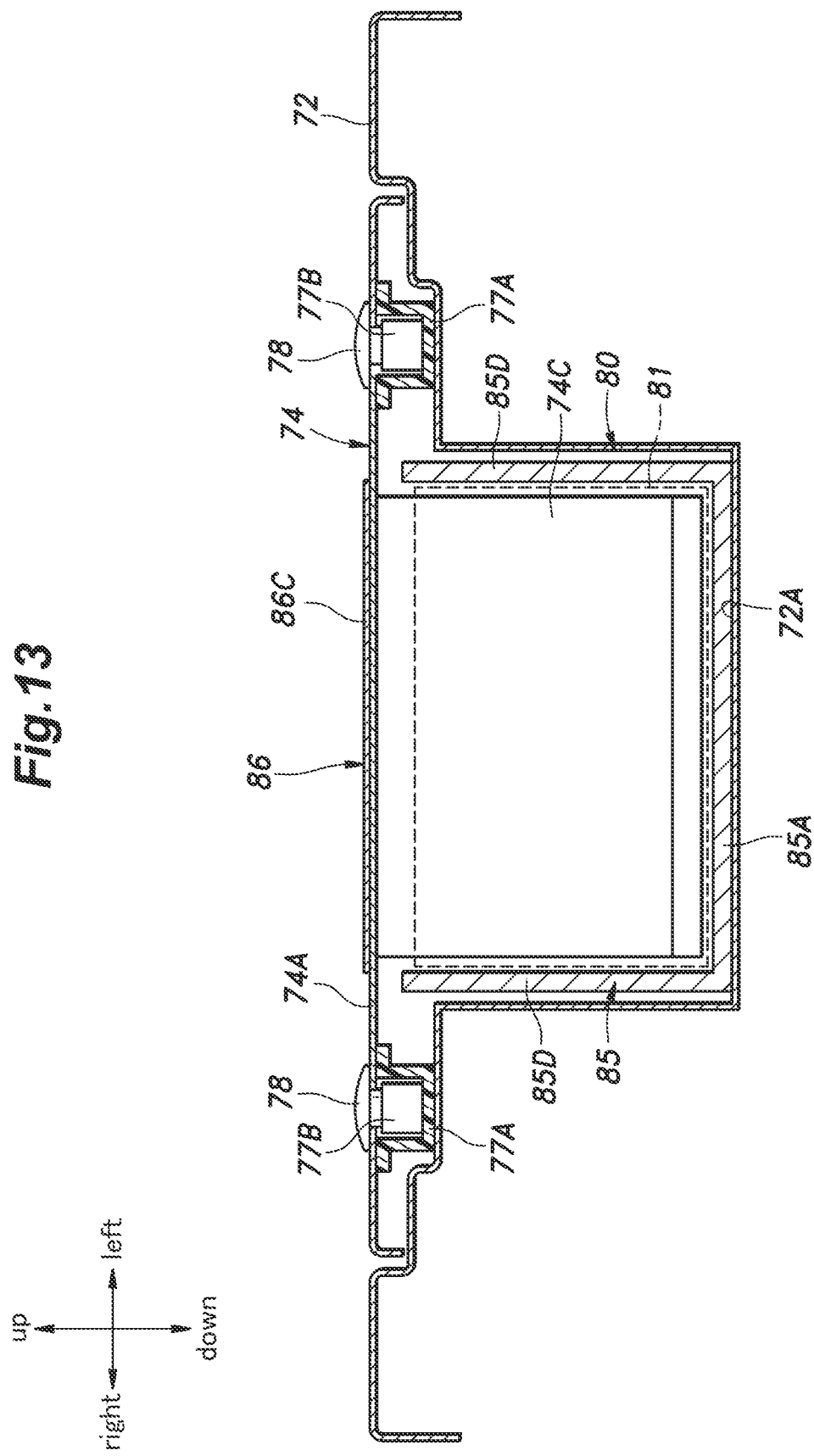
FIG. 13 is a sectional view of the fluid bag assembly in the inflated state.

As shown in FIGS. 12 and 13, an accommodation recess 72A that is recessed downward is formed in a laterally central portion of the upper surface of the front member 72. The front end and the rear end of the accommodation recess 72A may reach the front end and the rear end of the front member 72. A pair of left and right rails 77A extending in the front-rear direction are provided on the parts of the upper surface of the front member 72 to the left and right of the accommodation recess 72A. Each of the left and right rails 77A is provided with a slider 77B so as to be movable forward and rearward relative to the rail 77A. The upper plate 74A of the front member 72 is joined to the left and right sliders 77B by bolts 78. Thereby, the movable frame 74 is provided on the front member 72 to be movable forward and rearward via the sliders 77B and the rails 77A. The accommodation recess 72A is provided in a part of the front member 72 below the upper plate 74A.

With the upper plate 74A being displaced forward and rearward, the movable frame 74 moves relative to the front member 72 between an initial position and a protruding position. The movable frame 74 moves forward from the initial position to reach the protruding position. Also, the movable frame 74 moves rearward from the protruding position to return to the initial position.

The pad 12 of the seat cushion 3 is disposed to cover the upper surface and the front surface of the movable frame 74. When the movable frame 74 moves from the initial position to the protruding position, the movable frame 74 slides relative to the pad 12. The pad 12 has a sufficient length to cover the front plate 74B of the movable frame 74 even when the movable frame 74 is in the protruding position. Preferably, when the movable frame 74 is in the initial position, the front edge of the pad 12 extends more downward than the lower edge of the front plate 74B of the movable frame 74.

The seat 1 further includes an actuator 80 for moving the movable frame 74 forward and rearward relative to the front member 72. The actuator 80 includes a first actuator 81 that urges the movable frame 74 forward, a second actuator 82 that urges the movable frame 74 rearward, a case 85 accommodating the first actuator 81 and the second actuator 82, and a control device (not shown in the drawings) for controlling the urging force generated by each of the first actuator 81 and the second actuator 82.

As shown in FIG. 12, each of the first actuator 81 and the second actuator 82 is formed by a fluid bag assembly that inflates when compressed air is supplied and deflates when the compressed air is discharged. Preferably, the control device includes a compressor for generating compressed air, a connection pipe connecting the compressor to the first actuator 81, a connection pipe connecting the compressor to the second actuator 82, a control valve provided in each of the connection pipes, an electronic control unit (ECU) for controlling the compressor and the control valves, an operation switch for inputting signals to the electronic control unit, and so on.

The case 85 is disposed in the accommodation recess 72A and includes a bottom wall 85A extending in the front-rear direction, a front wall 85B extending upward from the front end of the bottom wall 85A, and a rear wall 85C extending upward from the rear end of the bottom wall 85A. The bottom wall 85A is fastened to the bottom portion of the accommodation recess 72A. Also, the case 85 preferably includes left and right end walls 85D extending in the front-rear direction along the left and right side edges of the bottom wall 85A, respectively, and each joined to the front wall 85B and the rear wall 85C. The bottom wall 85A, the front wall 85B, the rear wall 85C, and the left and right end walls 85D cooperate each other to form a box structure that is opened upward.

In a central portion of the rear end of the upper plate 74A of the movable frame 74, a pressure receiving plate 74C extending downward is provided. The pressure receiving plate 74C is disposed between the front wall 85B and the rear wall 85C. Also, the pressure receiving plate 74C is disposed between the left and right end walls 85D. The first actuator 81 is disposed between the front wall 85B and the pressure receiving plate 74C, and the second actuator 82 is disposed between the pressure receiving plate 74C and the rear wall 85C.

In accordance with expansion and contraction of the first actuator 81 and the second actuator 82, the pressure receiving plate 74C moves relative to the front wall 85B and the rear wall 85C, and the movable frame 74 moves forward and rearward relative to the front member 72.

The first actuator 81 and the second actuator 82 inflate when the compressed air is supplied to the first actuator 81 and the second actuator 82 corresponding thereto. When the control valves are in a holding state, the flow of air to the first actuator 81 and the second actuator 82 corresponding thereto is blocked, and the first actuator 81 and the second actuator 82 maintain the size. When the control valves are in a discharging state, the compressed air in the first actuator 81 and the second actuator 82 corresponding thereto is discharged to the outside, and the first actuator 81 and the second actuator 82 deflate.

The rear end of the cover member 86 is joined to a rear portion of the accommodation recess 72A. The cover member 86 includes a flange 86A fastened to a part of the accommodation recess 72A behind the rear wall 85C of the case 85, a vertical plate part 86B extending from the front edge the flange 86A upward behind the rear wall 85C, and a lateral plate part 86C extending forward from the upper end of the vertical plate part 86B to be disposed above the upper plate 74A of the movable frame 74. The lateral plate part 86C covers the rear portion of the upper plate 74A. The lateral plate part 86C supports the pad 12 from below.

In the shoulder support member 32 of the seat 1 described above, the second plate part 32C can be displaced relative to the first plate part 32A with deformation of the flexible part 32B. Therefore, when the shoulder support member 32 is pushed by the shoulder portion of the seated person, the first plate part 32A and the second plate part 32C can move to be along the shoulder portion. Thereby, the seat 1 capable of supporting the shoulder portion of the seated person comfortably can be provided.

Since the first plate part 32A and the flexible part 32B are disposed between the left and right back side members 22 as seen from front and at least a part of the second plate part 32C is disposed in front of the back side member 22, the first plate part 32A can be displaced rearward relative to the second plate part 32C along the back of the seated person. Also, as seen from front, since the flexible part 32B extends up and down along the laterally inner side edge of the back side member 22, the first plate part 32A can be displaced rearward without interfering with the back side member 22. Since the flexible part 32B has a slit 39, the first plate part 32A can be easily displaced relative to the second plate part 32C.

Since the second plate part 32C and the back side member 22 contact each other in the front-rear direction, the position of the second plate part 32C in the seat back 4 can be fixed. The second plate part 32C extends along the back side member 22 as seen from front. Since the second plate part 32C exists between the shoulder portion of the seated person and the back side member 22, the shoulder portion of the seated person can be supported comfortably.

Since the left and right shoulder support members 32 are provided on the left and right wire members 31, respectively, the left and right shoulder support members 32 can be displaced independently from each other so as to be along the shoulder portion of the seated person.

The fluid bag assemblies 52 can make parts of the seat back 4 corresponding to the shoulders of the seated person swell laterally inward and downward. Thereby, the seat back 4 in conformity with the position and shape of the shoulders of the seated person can be provided. Since each of the left and right fluid bag assemblies 52 inflates forward and laterally inward and downward, the fluid bag assembly 52 is disposed in a position that does not interfere with other devices such as the blower device, the lumber support member 44, and the near side airbag, in accordance with the physique of the seated person.

In the seat 1 according to the present embodiment, since the first side edge 61A and the second side edge 62A extend in mutually different directions, it is possible to vary the inflation direction of the second fluid bag 57 and the inflation direction of the third fluid bag 58. Thereby, the shape of the fluid bag assembly 52 when inflated can be diversified. The first to third fluid bags 56 to 58 are joined at the first joining part 61 and the second joining part 62 and the first communication hole 61B and the second communication hole 62B are formed in the first joining part 61 and the second joining part 62, respectively, whereby the structure is simple. The tab 56D of the first fluid bag 56 is bent and is fastened to the side surface 51B perpendicular to the support surface 32F, whereby the shoulder support 51 can be made compact in size.

The fluid bag assemblies 52 can make parts of the seat back 4 corresponding to the shoulders of the seated person swell laterally inward and downward. Thereby, the seat back 4 in conformity with the position and shape of the shoulders of the seated person can be provided. Since each of the left and right fluid bag assemblies 52 inflates forward and laterally inward and downward, the fluid bag assembly 52 is disposed in a position that does not interfere with other devices such as the blower device, the lumber support member 44, and the near side airbag, in accordance with the physique of the seated person.

Concrete embodiments of the present invention have been described in the foregoing, but the present invention is not limited to the above embodiments and may be modified or altered in various ways. In another embodiment, the upper cross member 23 and the middle cross member 25 may be formed integrally. Also, the middle cross member 25 may be omitted, and the upper end of the wire member 31 may be joined to the upper cross member 23.

Figure 11:
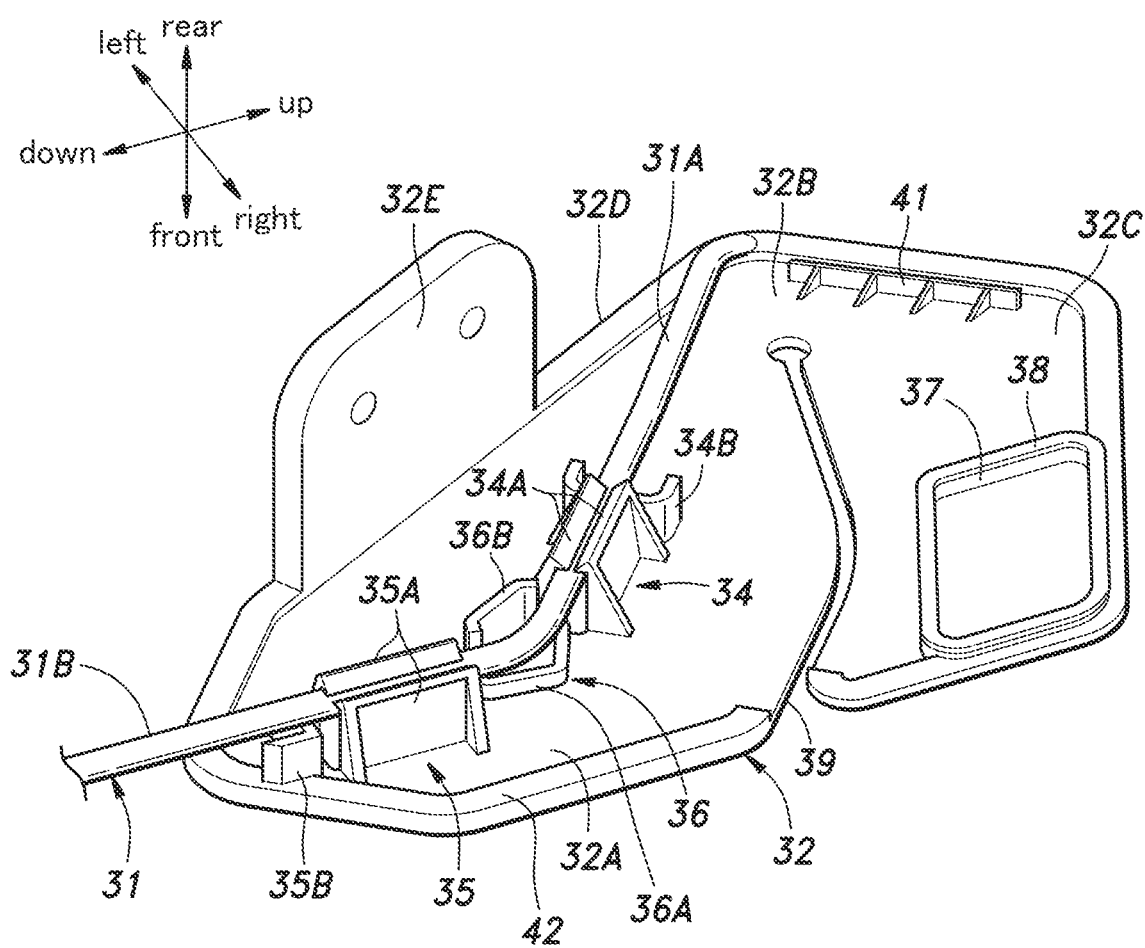
FIG. 11 is a perspective view showing a rear surface of a shoulder support member according to a modification.

As shown in FIG. 11, the second plate part 32C and the right back side member 22 mat contact each other in the front-rear direction via a cushioning material 38. The cushioning material 38 preferably is a member having flexibility, such as an unwoven fabric or a rubber sheet, for example. The cushioning material 38 preferably is interposed between the butting portion 37 and the front surface of the right back side member 22. With the second plate part 32C contacting the front surface of the right back side member 22 via the cushioning material 38, generation of friction sound and rattling sound can be prevented.

Also, the rear surface of the second plate part 32C may be provided with a reinforcement structure 41. The reinforcement structure 41 improves the stiffness of the second plate part 32C. Preferably, the reinforcement structure 41 is a rib(s) projecting from the rear surface of the second plate part 32C. The reinforcement structure 41 is preferably provided on an upper portion of the rear surface of the second plate part 32C.

The fluid bag assembly 52 may be provided in the seat cushion 3 and/or the headrest 29. Also, the fluid bag assembly 52 may include four or more fluid bags without being limited to the three fluid bags 56 to 58. For example, the fluid bag assembly 52 may include a fourth fluid bag joined to the third fluid bag 58 and a fifth fluid bag joined to the fourth fluid bag.

Figure 14:
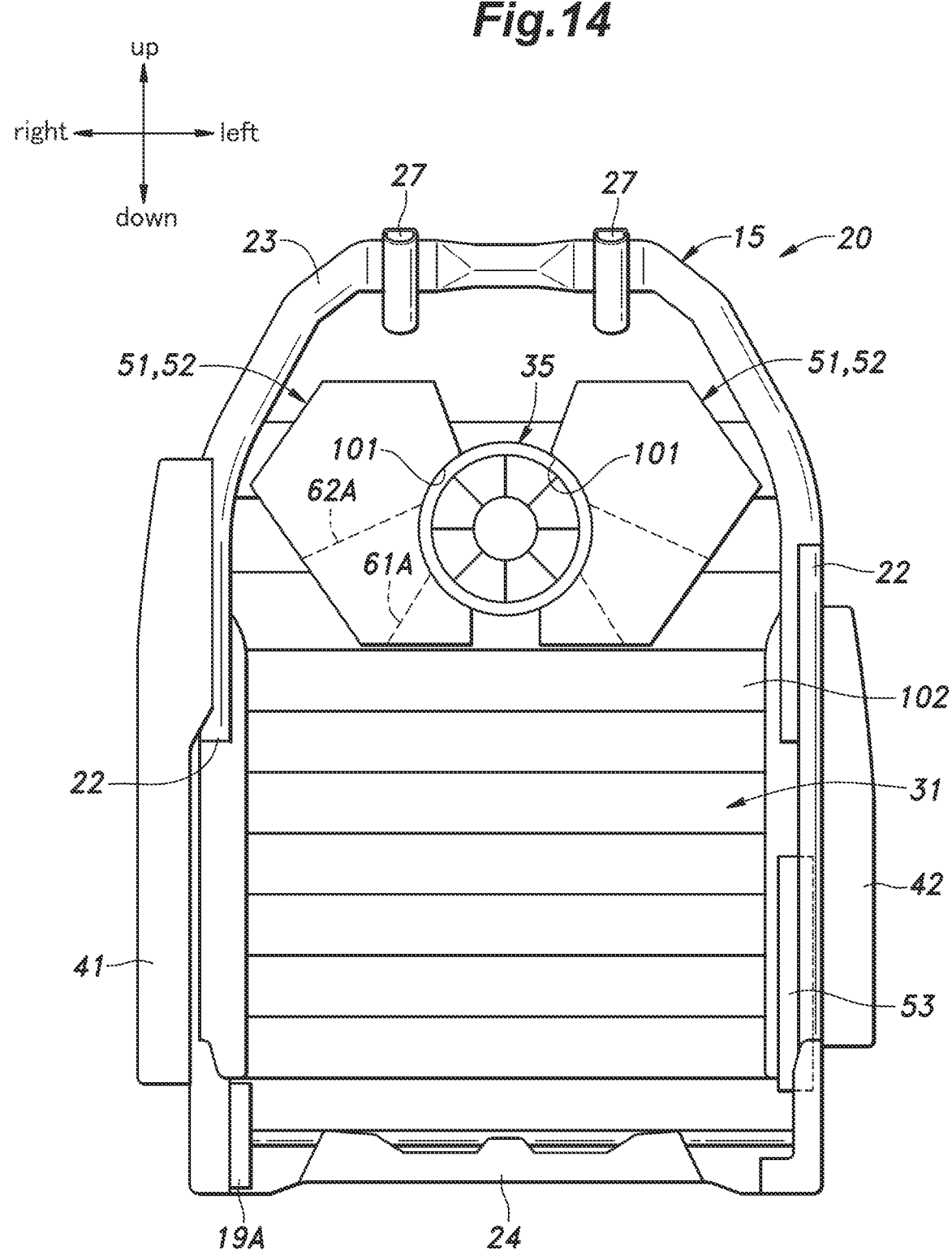
FIG. 14 is a front view of a seat back frame according to a partially modified embodiment.

In an embodiment in which part of the above embodiment is modified, as shown in FIG. 14, the fluid bag assemblies 52 may be disposed close to the perimeter of the blower 46. In this case, it is preferred if each fluid bag assembly 52 has a recess 101 that is recessed laterally outward in the laterally inner side edge thereof, and the left and right side portions of the blower 46 are disposed in the respective recesses 101. Each recess 101 is preferably formed in a shape along the outer edge of the blower 46. For example, it is preferred if the blower 100 is formed in a cylindrical shape and each recess 101 is formed in an arc shape having a radius same as that of the blower 100. Thereby, it is possible to increase the size of each fluid bag assembly 52 while avoiding interference between the fluid bag assembly 52 and the blower 46. Also, a support plate 102 of the lumber support member 44 may extend laterally so that the left end and the right end reach the left and right back side members 22. The blower 46 may be supported on the support plate 102. Also, the support plate 102 of the lumber support member 44 may constitute the shoulder support of each fluid bag assembly 52. In this case, it is preferred if the fluid bag assembly 52 is joined to the support plate 102.

LIST OF REFERENCE NUMERALS 1 seat
3 seat cushion
4 seat back
15 seat back frame
22 back side member
23 upper cross member
24 lower cross member
25 middle cross member
31 wire member
31A upper end portion
31B upper side the intermediate portion
31C lower intermediate portion
31D lower end portion
31E connecting portion
32 shoulder support member
32A first plate part
32B flexible part
32C second plate part
32D inner side edge
32E fastening part
34 first locking portion
35 second locking portion
36 positioning part
37 butting portion
38 cushioning material
39 slit
41 reinforcement structure
44 lumber support member
46 blower
52 fluid bag assembly

The invention claimed is:

1. A vehicle seat provided with a seat cushion and a seat back, wherein the seat back comprises:
left and right side members extending up and down;
a lower cross member extending laterally and joined to the left and right side members;
a cross member extending laterally above the lower cross member and joined to the left and right side members;
at least one wire member extending up and down and joined to the lower cross member and the cross member; and
at least one shoulder support member supported on an upper portion of the wire member, and
the shoulder support member comprises:
a first plate part facing in a front-rear direction and joined to the upper portion of the wire member; and
a second plate part facing in the front-rear direction and connected to the first plate part via a flexible part.

2. The vehicle seat according to claim 1, wherein a plate-shaped lumber support member facing in the front-rear direction is supported on a lower portion of the wire member.

3. The vehicle seat according to claim 1 or 2, wherein the wire member includes a first portion and a second portion that are inclined relative to each other via a bending portion, and
the first plate part of the shoulder support member includes a first locking portion that locks the first portion and a second locking portion that locks the second portion.

4. The vehicle seat according to claim 3, wherein the first plate part of the shoulder support member includes a positioning part between the first locking portion and the second locking portion, the positioning part contacting the first portion and the second portion.

5. The vehicle seat according to any one of claims 1 to 4, wherein, the first plate part and the flexible part are disposed between the left and right side members as seen from front, and at least a part of the second plate part is disposed in front of the side member.

6. The vehicle seat according to claim 5, wherein the flexible part extends up and down along a laterally inner side edge of the side member as seen from front.

7. The vehicle seat according to claim 6, wherein the flexible part has a slit penetrating therethrough in the front-rear direction and extending up and down with a lower end opened.

8. The vehicle seat according to any one of claims 1 to 7, wherein a fluid bag assembly that inflates upon supply of fluid is provided on a front surface of the shoulder support member.

9. The vehicle seat according to claim 8, wherein the shoulder support member includes a support surface extending along a first direction and facing forward,
a fluid supply device is connected to the fluid bag assembly,
one side in the first direction is referred to as a first side and another side in the first direction is referred to as a second side,
the fluid bag assembly comprises:
a first fluid bag disposed on the support surface;
a second fluid bag which includes, in an end portion on the first side, a first joining part joined to the first fluid bag, and communicates with the first fluid bag; and
a third fluid bag which includes, in an end portion on the first side, a second joining part joined to the second fluid bag, and communicates with the second fluid bag, and
in a state in which the fluid bag assembly is deflated, a first side edge, which is a side edge of the first joining part on the second side, and a second side edge, which is a side edge of the second joining part on the second side, each extend linearly and extend in mutually different directions, as seen in a direction perpendicular to the support surface.

10. The vehicle seat according to claim 9, wherein the second side edge is disposed further on the second side than the first side edge.

11. The vehicle seat according to claim 9 or 10, wherein a length of the second fluid bag in the first direction is longer than a length of the third fluid bag in the first direction.

12. The vehicle seat according to any one of claims 9 to 11, wherein the fluid supply device is connected to the first fluid bag,
the first fluid bag and the second fluid bag are connected by a first communication hole passing through the first joining part, and
the second fluid bag and the third fluid bag are connected by a second communication hole passing through the second joining part.

13. The vehicle seat according to any one of claims 9 to 12, wherein the first fluid bag, the second fluid bag, and the third fluid bag extend in the first direction.

14. The vehicle seat according to any one of claims 9 to 13, wherein the first fluid bag includes a tab protruding to a side, and
the tab is fastened to a side surface perpendicular to the support surface of the shoulder support member.

15. The vehicle seat according to any one of claim 9 to 14, wherein the shoulder support member includes a pair of left and right shoulder support members and the fluid bag assembly includes a pair of left and right fluid bag assemblies,
- the left and right shoulder support members are disposed on a left part and a right part of an upper portion of the seat back such that the first side becomes a laterally inner side and a lower side, and
- in the state in which the fluid bag assembly is deflated, each of the first side edge and the second side edge extends obliquely downward in a laterally outward direction, as seen from front.

\* \* \* \* \*